US006272668B1

(12) United States Patent
Teene

(10) Patent No.: US 6,272,668 B1
(45) Date of Patent: Aug. 7, 2001

(54) METHOD FOR CELL SWAPPING TO IMPROVE PRE-LAYOUT TO POST-LAYOUT TIMING

(75) Inventor: Andres R. Teene, Fort Collins, CO (US)

(73) Assignees: Hyundai Electronics America, Inc., San Jose, CA (US); NCR Corporation, Dayton, OH (US)

(*) Notice: Subject to any disclaimer, the term of this patent is extended or adjusted under 35 U.S.C. 154(b) by 0 days.

(21) Appl. No.: 09/318,388

(22) Filed: May 25, 1999

Related U.S. Application Data

(63) Continuation of application No. 08/355,791, filed on Dec. 14, 1994, now abandoned.

(51) Int. Cl.[7] ............................................. G06F 17/50
(52) U.S. Cl. ................................ 716/10; 716/6; 716/9; 716/12; 716/2
(58) Field of Search ..................... 395/500.02–500.19; 716/1–21

(56) References Cited

U.S. PATENT DOCUMENTS

| 4,698,760 | 10/1987 | Lembach et al. ........................ 716/6 |
| 4,754,408 | 6/1988 | Carpenter et al. ........................ 716/9 |

(List continued on next page.)

OTHER PUBLICATIONS

Robert B. Hitchcock, Sr. et al., "Timing Analysis of Computer Hardware," IBM J. Res. Develop., vol. 26, No. 1, Jan. 1982, pp. 100–105.

Michael Burstein, Mary N. Youssef, "Timing Influenced Layout Design," IEEE 1985 Paper 9.2 (pp. 124–129), Jan. 1985.

Steven Teig, Randall L. Smith, John Seaton, "Timing–Driven Layout of Cell–Based ICs," Design Automation Guide 1987, (pp. 94–101), Jan. 1987.

Peter S. Hauge, Ravi Nair, Ellen J. Yoffa, "Circuit Placement for Predictable Performance," IEEE International Conference on Computer–Aided Design, Santa Clara, CA, Nov. 9–12, 1987 (pp. 88–91).

(List continued on next page.)

Primary Examiner—Matthew Smith
Assistant Examiner—Phallaka Kik
(74) Attorney, Agent, or Firm—Townsend and Townsend and Crew LLP

(57) ABSTRACT

A method for improving the timing performance of a standard cell ASIC layout. The method is operable at any phase of the ASIC design cycle including following the completion of layout phase placement and routing. The method compares post-layout timing values with pre-layout timing targets for each timing arc associated with each standard cell component of the ASIC design. For each timing arc, a functionally equivalent cell having higher or lower output drive is selected which optimally improves the timing slack on each timing arc. To assure that the method converges and terminates, a list of timing slack values, one for each timing arc of the ASIC design, is constructed in sorted order from worst timing slack to best timing slack. The swap method determines in order from worse timing slack to best a functionally equivalent standard cell which may be swapped to improve the timing slack on the timing arc. Once a standard cell is swapped for a given timing arc, no further swaps need be made for subsequent entries on the sorted list: the timing slack of subsequent entries is assured to be better than the worse timing slack value of an earlier encountered timing arc in the sorted list.

23 Claims, 11 Drawing Sheets

U.S. PATENT DOCUMENTS

| | | | |
|---|---|---|---|
| 4,827,428 | | 5/1989 | Dunlop et al. ............................ 716/6 |
| 5,003,487 | | 3/1991 | Drumm et al. ......................... 716/18 |
| 5,074,037 | | 12/1991 | Sutcliffe et al. ........................ 29/847 |
| 5,111,413 | | 5/1992 | Lazansky et al. ...................... 703/14 |
| 5,140,402 | | 8/1992 | Murakata .............................. 257/499 |
| 5,173,864 | | 12/1992 | Watanabe et al. ........................ 716/6 |
| 5,197,015 | | 3/1993 | Hartoog et al. ......................... 716/12 |
| 5,218,551 | | 6/1993 | Agrawal et al. ......................... 716/10 |
| 5,231,590 | | 7/1993 | Kumar et al. ........................... 716/11 |
| 5,237,514 | | 8/1993 | Curtin .................................... 716/10 |
| 5,249,134 | | 9/1993 | Oka .......................................... 716/5 |
| 5,282,148 | | 1/1994 | Poirot et al. .............................. 716/6 |
| 5,308,798 | | 5/1994 | Brasen et al. ......................... 438/129 |
| 5,333,032 | | 7/1994 | Matsumoto et al. ..................... 716/6 |
| 5,396,435 | * | 3/1995 | Ginetti ...................................... 716/6 |
| 5,406,497 | | 4/1995 | Altheimer et al. ....................... 716/6 |
| 5,422,317 | * | 6/1995 | Hua et al. .............................. 438/129 |
| 5,426,591 | * | 6/1995 | Ginetti et al. ............................ 716/6 |
| 5,461,576 | | 10/1995 | Tsay et al. .............................. 716/13 |
| 5,471,409 | | 11/1995 | Tani ......................................... 716/1 |
| 5,475,605 | | 12/1995 | Lin ........................................ 716/18 |
| 5,490,268 | | 2/1996 | Matsunaga ........................... 714/724 |
| 5,508,937 | | 4/1996 | Abato et al. ............................. 716/6 |
| 5,521,835 | | 5/1996 | Trimberger ........................... 716/17 |
| 5,553,000 | * | 9/1996 | Dey et al. ................................. 716/6 |
| 5,598,344 | * | 1/1997 | Dangelo et al. ....................... 716/18 |
| 5,654,898 | * | 8/1997 | Roetcisoender et al. ................ 716/9 |
| 5,764,525 | * | 6/1998 | Mahmood et al. .................... 716/18 |

OTHER PUBLICATIONS

Maciej J. Ciesielski, "Layer Assignment for VLSI Interconnect Delay Minimization," IEEE Transactions on Computer–Aided Design, vol. 8, No. 6, Jun. 1989 (pp. 702–707).

Malgorzata Mrek–Sadowska, Shen P. Lin, "Timing Driven Placement," IEEE 1989 (pp. 94–97), Jan. 1989.

Albert H. Chao, Eric M. Nequist, Thanh D. Vuong, "Direct Solution of Performance Constraints During Placement," IEEE 1990 Custom Integrated Circuits Conference (pp. 27.2.1–27.2.4), Jan. 1990.

J. Cong, A. Kahng, G. Robins, M. Sarrafzadeh, C.K. Wong, "Performance–Driven Global Routing for Cell Based IC's," IEEE 1991 (pp. 170–173), Jan. 1991.

P. Vanbekbergen, G. Goossens, H. DeMan, "Specification and Analysis of Timing Constraints in Signal Transition Graphs," IEEE 1992 (pp. 302–306), Jan. 1992.

R. Iris Bahar, Gary D. Hachtel, Enrico Macii, Abelardo Pardo, Massimo Poncino, Fabio Somenzi, "An Add–Based Algorithm for Shortest Path Back–Tracing of Large Graphs," IEEE 1994 (pp. 248–251), Jan. 1994.

Michael A.B. Jackson, Ernest S. Kuh, "Performance–Driven Placement of Cell Based IC's,"Dept. of Electrical Engineering and Computer Sciences, Univ. of California, Berkeley, CA 94720, No date.

* cited by examiner

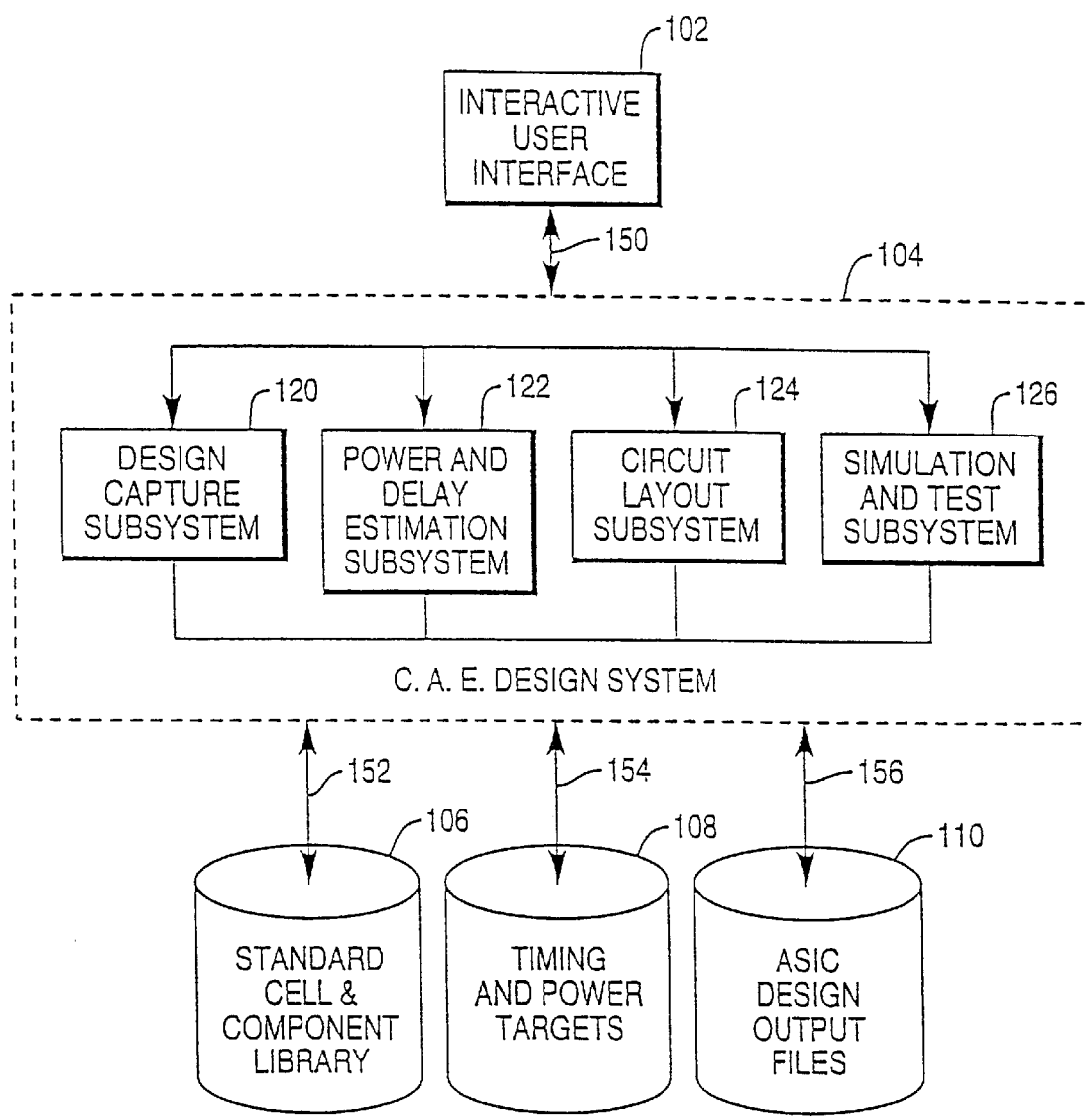

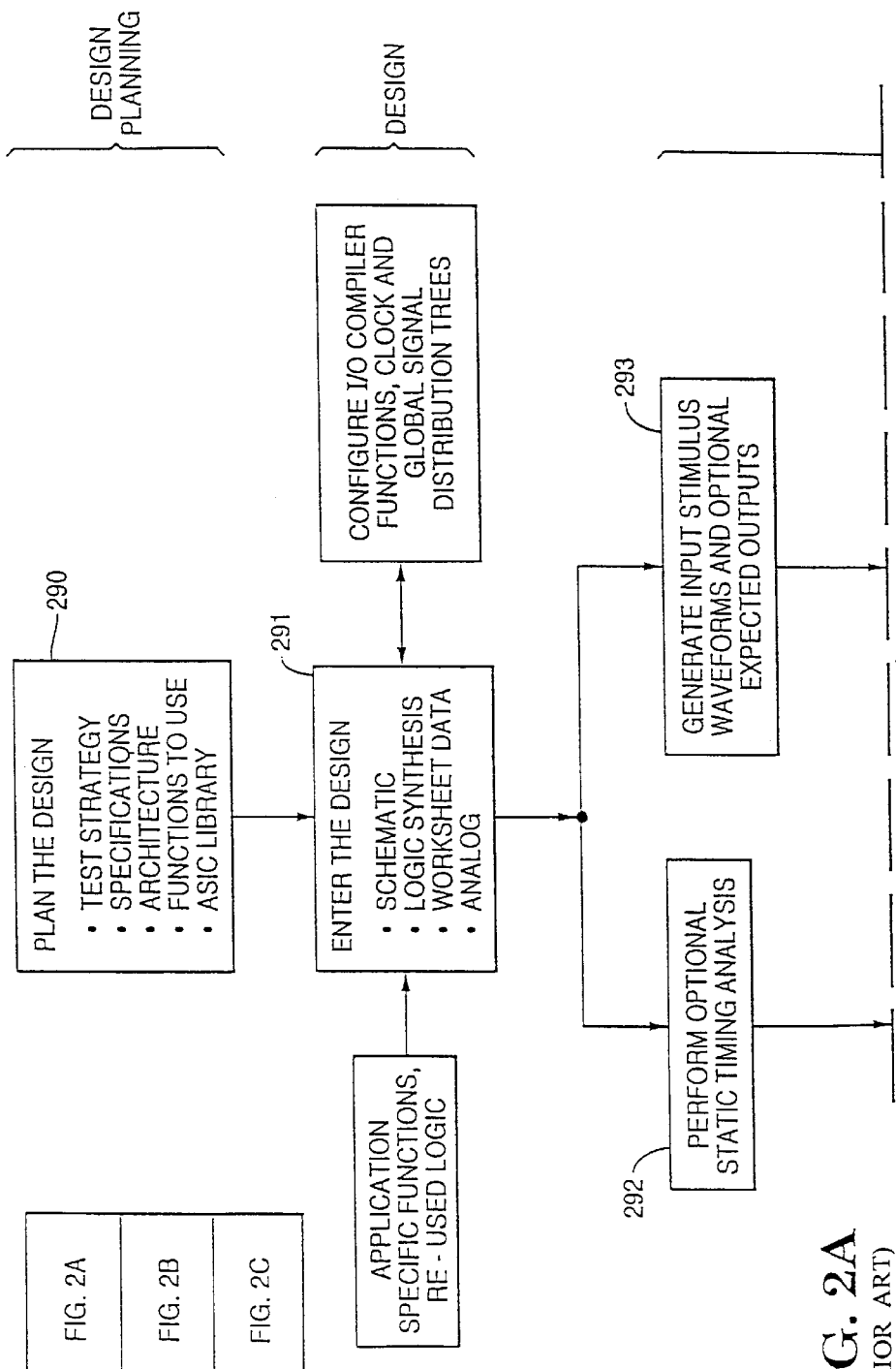

METHOD FOR CELL SWAPPING TO IMPROVE PRE-LAYOUT TO POST-LAYOUT TIMING

This application is a continuation of and claims the benefit of U.S. application Ser. No. 08/355,791, filed Dec. 14, 1994 now abandoned, the disclosure of which is incorporated by reference.

FIELD OF THE INVENTION

The present invention relates to computer aided engineering electronics design tools and more particularly to a new method used within such tools as applied to the layout of custom integrated circuits using standard cell libraries.

BACKGROUND OF THE INVENTION

Computers have long been utilized to assist engineers in the design of electronic circuits, in particular to assist in the design of integrated circuits. Computer aided engineering (hereinafter CAE) design tools assist the user in the initial design of functional circuitry through the use of a graphical user interface. In general, such CAE design tools permit a user to select an electronic component useful for the intended application from a menu of components known to the system. Next, the tools typically permit a user to place a graphical representation of the selected component on the graphic display screen. Appropriate graphical connections, representing electrical interconnections, between the newly placed component and previously placed components are then "drawn" by the user through the graphical user interface. Tools such as described above which interact with a user to create a graphical representation of the intended application circuit are often referred to as design capture tools.

Following design capture, many other types of CAE tools are known to assist a design engineer in other aspects of the application circuit design. CAE tools are known to perform simulation of the circuits to help locate functional errors in the design. Other tools are used to perform physical layout of the circuit either in the form of discrete components on a printed circuit board, or in the form of custom circuits within an integrated circuit package (known as application specific integrated circuits and hereinafter referred to as ASIC).

ASICs may be designed and implemented using a variety of different chip design products and methods. These methods include "full custom" chip design in which a designer plans the layout and interconnection of every component down to the lowest levels such as individual transistors, capacitors, resistors and the like. Full custom chip design permits the designer to carefully plan every aspect of the chip design to optimize for performance, power management, and physical size. Though full custom chip design allows for the maximum flexibility in design choices, there is usually a significant cost due to complexity of the design and manufacturing processes.

The complexity of full custom chip design is somewhat reduced by use of "gate arrays" in ASIC design. Gate arrays are ASICs in which the designer uses standard components having a higher level of integration to implement the ASIC rather than using exclusively individual transistors and other low level components. In gate array ASIC designs, a designer constructs the desired application circuit utilizing higher level components such as logic gates. A designer may more rapidly design and implement an ASIC using these higher level components but some flexibility may be sacrificed in areas such as performance. "Standard cell" design tools and methods provide component libraries with still higher levels of integration to thereby further simplify the design process. In standard cell design processes, a designer selects among standard functional cells such as adders, decoders, flip-flops, latches, multiplexors, etc. The use of these standard cells which have a higher level of integration further enhances the speed with which a designer may implement an ASIC.

The process of "laying out" an ASIC involves determining a physical placement of the desired circuit components within the integrated circuit (hereinafter IC) package design in such a way as to optimize for parameters such as performance, physical space, and power dissipation. The layout tasks include placement of the desired components as well as routing of interconnection conductor signal paths between the components. In full custom ASIC designs, the designer may interact with CAE tools to control the placement and routing of each low level component in the ASIC. Placing related components closer to one another may improve performance, for example, by reducing the capacitive loads due to length of the interconnection leads between signals to thereby reduce the propagation delays between components. The layout process involves tradeoffs in several interrelated aspects of the ASIC design. Often, a placement of a component in one location within the ASIC will improve the circuit's performance with respect to one parameter but degrade the performance with respect to another parameter. Or a particular placement may improve performance relative to one interconnect path but degrade performance for another path. In gate array or standard cell ASIC designs, other physical constraints of the ASIC layout are imposed by the physical construction of the components within the manufactured IC package. CAE tools typically automate the placement and layout of the components within the gate array or standard cell IC package while attempting to satisfy, primarily, surface area design constraint specifications.

Balancing these tradeoffs can require changing, or swapping, a component selected by the designer to a functionally equivalent component optimized for a different performance, area, or power dissipation goal. Clearly, it is known in the art for a designer to perform such swapping of components manually by iteratively re-designing and analyzing the ASIC. Determining the appropriate balance of these tradeoffs requires analysis of the ASIC design. To analyze an ASIC design with respect to timing, a designer first specifies timing constraints for input or output connections to pins on the IC package for connecting the ASIC chip to other devices. Next, the designer uses CAE analysis tools to determine if the design meets the specified constraints.

Static timing analysis CAE tools are used to automate computation of timing performance of signals within the ASIC design. An ASIC designer, aided by CAE tools, compares the timing estimates produced by such static timing analysis tools to the design constraints to determine whether all constraints have been met. Simulation CAE tools are also common to simulate the actual operation of the ASIC design against a set of test input vectors to determine whether the ASIC design violates any functionality or timing constraints when simulating operation on actual test data inputs. Prior CAE tools, often in conjunction with the designer's manual intervention, iteratively attempted many component placement options to correct any violations of the specified constraints. In the event no satisfactory placement could be determined, CAE design tools informed the user to permit correction of the violation by re-design of the ASIC. A designer could then correct the violation by selecting an alternate component with different operating characteristics.

In standard cell design methodologies, as well as other methods, it is common for a CAE design tool to provide a library of available components which include a variety of functionally equivalent components each having different operating characteristics (such as variable timing specifications or drive power etc.). It is a time consuming process for a designer to manually review the simulation or static timing analysis results and redesign the ASIC to swap components in hopes of eliminating the design constraint violations. In addition, the process could be iterative in that a possible component swap selection may improve design margins with respect to constraints for some interconnect paths while degrading margins in other interconnect paths. The designer must typically verify timing constraints to evaluate the efficacy of the possible component selected for the swap. Several re-design, re-simulate iterations may be required to find an appropriate alternate component selection to resolve any constraint violations.

Methods common to prior CAE design tools attempt to assist the designer in automating the placement, layout and routing of gate array and standard cell ASIC designs. One prior approach, typified by the Synopsys In Place Optimization (IPO) produced by Synopsis, Inc. in their Design Compiler product, is to require an ASIC designer to identify all interconnection paths for which timing constraints are critical and a set of components which may be substituted to attempt to improve the interconnection path timing. The Synopsys IPO method evaluates timing for all critical paths identified by the designer to locate timing violations in the ASIC design and to identify possible component swaps to improve the timing. This method, however, depends upon the manual intervention of the designer to specify correctly and completely required timing constraints needed to identify the critical paths to be checked and the functionally equivalent components available for possible component swaps. In addition, the IPO method does not evaluate interconnection paths other than the critical paths and therefore may not fully optimize the entire ASIC design and layout. This excludes, for example, delay paths for asynchronous circuits which are difficult to analyze with static timing analysis tools.

Other prior designs have attempted to further automate the layout phase of an ASIC design to determine appropriate tradeoffs in the circuit layout versus the design constraint parameters specified by the designer. In U.S. Pat. No. 5,218,551, issued Jun. 8, 1993, Agrawal et al. disclose a timing driven placement method which attempts to move portions of the circuit design between areas ("precincts") of the ASIC to minimize propagation delays. The placement method disclosed by Agrawal does not address the delays imposed by physical routing constraints of the interconnection conductor signal paths. Agrawal's method only considers estimates of the capacitive loads and delays associated with the interconnection of the placed components. Such timing estimates are derived by operation of static timing analysis CAE tools. Until the ASIC design is placed and all interconnections are routed, precise delay estimates are unavailable. In addition, Agrawal's reliance on static timing analysis renders the method less useful to ASIC designs which include asynchronous functional components. Static timing analysis tools require a designer to supply all timing relationship constraints to properly analyze the operation of the circuit. Designers of asynchronous ASIC designs cannot always fully specify the timing constraints required for static timing analysis. Agrawal's method leaves as a task for other tools and methods to resolve "timing and wiring" problems.

U.S. Pat. No. 5,173,864, issued Dec. 22, 1992 to Watanabe et al., discloses a standard cell component which provides a programmable delay time between its input signal and its corresponding output signal. This variable delay standard cell component may be used by a designer in the interconnection between other standard cell components. CAE tools may then automatically adjust the timing of the variable delay standard cell to alter propagation delays along a signal interconnection path. Watanabe's variable delay standard cell allows the timing to be adjusted without replacing other standard cell components in the ASIC design. However, this method and apparatus only permit the addition of delays to signal interconnection paths. This method and apparatus does not address the design issues surrounding reduction of the interconnection propagation delays. In addition, the methods disclosed by Watanabe are not assured to terminate (converge) with an improved design to satisfy the required timing constraints of the ASIC design. Watanabe makes only vague reference to a determination that a particular change to the delay on one isolated interconnection signal path is "OK." There is no disclosure with regard to what measures are used to make that determination, nor to the possibility that a change may be "OK" with respect to one interconnection signal path but may unacceptably degrade another interconnection signal path.

Dunlop et al., in U.S. Pat. No. 4,827,428, issued May 2, 1989, discusses a method for altering the size of individual transistors in a full custom ASIC design to meet user defined timing constraints on user identified critical paths. As discussed above with respect to Agrawal, Dunlop's method uses only timing estimates derived from static timing analysis CAE tools for identified critical paths. These estimates fail to take into account more precise determination of the interconnection signal propagation delay times available after routing of the ASIC interconnections.

In U.S. Pat. No. 4,698,760, issued Oct. 6, 1987 to Lembach et al., a method is disclosed to optimize signal timing and power dissipation in IC designs. Like other prior designs discussed above, Lembach's method is used at the design phase before completion of layout placement and routing. Because of this limitation, Lembach's method relies on inaccurate estimates of interconnection propagation delays.

In addition to the above problems, Dunlop's and Lembach's methods, like Watanabe's method, are iterative in such a manner that they are neither assured to complete nor to converge on improved timing. Under certain pathological design constraints, all three methods may loop infinitely never converging on improved designs for the ASIC timing constraints.

Finally, in addition to the above identified problems, Lembach's and Watanabe's methods, like Agrawal's method, rely on static timing analysis to estimate the actual timing of the selected components and associated interconnection signal paths. As discussed above, reliance on static timing analysis renders all three methods less useful to ASIC designs which include asynchronous functional components. Static timing analysis tools must be supplied with all timing relationship constraints to properly operate. Designers of asynchronous ASIC designs cannot always fully specify the timing constraints required for static timing analysis. Extensive timing constraints may be needed from the designer in order to fully analyze the ASIC design with static timing analysis tools. Another problem arises in the tendency of static timing analysis tools generating erroneous or false paths: paths identified as critical which are not valid.

It is therefore apparent that a need exists in CAE ASIC design tools for an improved method to automatically select an optimum, functionally equivalent circuit component for swapping with a circuit component selected by the designer in an ASIC layout when the designer's component selection violates design constraints such as signal timing.

SUMMARY OF THE INVENTION

The present invention solves the above problems and others by providing a method for automatically determining the optimum component to be swapped for a functionally equivalent component which violates design constraint parameters in an ASIC layout. The cell swapping method of the present invention evaluates post-layout actual signal timing for every interconnection path relating to each component in the ASIC layout to determine the difference between pre-layout timing target specifications and post-layout timing values. The post-layout timing values are computed from the interconnect parasitics and cell delay equations. By using post-layout timing values, the present invention is more accurate than previous design tools because it may determine the need for, and results of, a cell swap using actual interconnection timing values. The interconnection timing values are actual timings derived from the ASIC design following completion of placement and (initial) routing of cell interconnections. The present invention next determines the estimated change in timing (change in timing slack) obtained by swapping each component with a functionally equivalent component having different timing characteristics. If the swapped component improves the ASIC layout with respect to timing target constraints, and if the improvement is optimal with regard to all possible functionally equivalent components, then the component is swapped.

The method of the present invention primarily swaps cells to alter drive power thereby minimizing timing slack for interconnecting signals within the ASIC. As a secondary benefit of this timing optimization, power dissipation in the IC is usually reduced. The method of the present invention may also be used to optimize primarily for other design constraints such as power dissipation or physical area.

The cell swapping method of the present invention does not depend on the ASIC designer's input to specify timing constraints for critical paths in order to determine which paths need be considered for improvement. Instead, the present invention determines the "slack" for timing on every path of the ASIC layout following completion the layout placement and routing procedures of the users CAE tools using the data available in the standard design-flow. If the designer does not specify a timing constraint for a particular path, standard default timing target values are automatically generated for the path. Default timing target values are derived from statistical information regarding ASIC designs of similar size and complexity. A designer may specify a timing constraint for any path in the ASIC layout to override this statistical default timing target value. In addition, a designer may specify critical path timing constraints which the methods of the present invention utilize to override statistically derived default values.

The timing "slack" for an interconnection path is the difference between the pre-layout timing target value and the post-layout timing value. For each standard cell component in the ASIC design, every functionally equivalent cell is inspected to determine the change in timing slack if the equivalent standard cell were swapped for the designer's selected cell. The designer's selected standard cell component is swapped for whichever functionally equivalent standard cell provides the optimal improvement in timing slack for the associated interconnection path.

The cell swapping method of the present invention automatically determines the optimal standard cell selection to minimize timing slack given a particular physical layout and given a library of functionally equivalent standard cells. The method of the present invention may also be applied to minimize the power dissipation of the ASIC by selecting the standard cell with the lowest output drive power which will achieve the desired timing targets for each interconnection path in the IC.

Although the present invention is intended primarily to function with particular formats for the ASIC design description, the lists of functionally equivalent standard cells, the pre-layout timing targets, and the post-layout timing values, the method may be used with a wide variety of input formats. This aspect of the invention allows a user to integrate a variety of CAE design tools with the cell swapping method of the present invention.

The method of the present invention, unlike prior methods discussed above, does not rely on static timing analysis tools to determine the timing of each timing arc in the ASIC design. The present invention relies instead on statistical, historical information regarding the size and complexity of the ASIC to derive a default pre-layout timing estimate for each path. These timing estimates are modified by heuristics based on specific knowledge of prior similar designs, by explicit overriding timing constraint specifications supplied by the designer, or by critical path specifications supplied by the designer. Regardless of the derivation of the pre-layout timing target value, the methods of the present invention evaluate every timing arc of the ASIC layout to determine the possible timing or other performance improvements obtainable by swapping functionally equivalent standard cell components.

In addition, the method of the present invention is assured to terminate with an improved ASIC layout if any improvement is possible. If improvement is not possible, the method of the present invention is still assured to terminate with the optimum design possible given the set of equivalent components supplied in the standard cell library.

The present invention automatically alters design documentation files to reflect the swapped components in the design. This aspect of the present invention relieves the designer of the need to manually back-annotate the design to reflect changes made by the cell swapping method.

It is therefore an object of the present invention to provide a method for swapping standard cell components in an ASIC design to conform post-layout timing values to pre-layout timing targets.

It is a further object of the present invention to provide a method for swapping standard cell components in an ASIC design to conform post-layout power dissipation of the ASIC to the pre-layout target values.

It is a further object of the present invention to provide a method for swapping standard cell components in an ASIC design to conform post-layout IC layout area of the ASIC to pre-layout target values.

It is yet another object of the present invention to provide a method for swapping standard cell components in an ASIC design to conform pre-layout timing targets and post-layout timing values for all standard cell circuit components in the layout.

It is yet another object of the present invention to provide a method for swapping standard cell components in an ASIC design to conform pre-layout timing targets and post-layout timing values for all components on a critical timing path of the design.

Still a further object of the present invention is to provide a method for swapping standard cell components in an ASIC design to conform pre-layout timing targets and post-layout timing values independent of designer intervention to specify critical timing paths.

The above and other objects, features, and advantages of the present invention will become apparent from the following description and the attached drawing.

BRIEF DESCRIPTION OF THE DRAWINGS

FIG. 1 is a block diagram of a CAE system which may advantageously utilize the methods of the present invention;

DETAILED DESCRIPTION OF THE PREFERRED EMBODIMENT

Figure 2B:
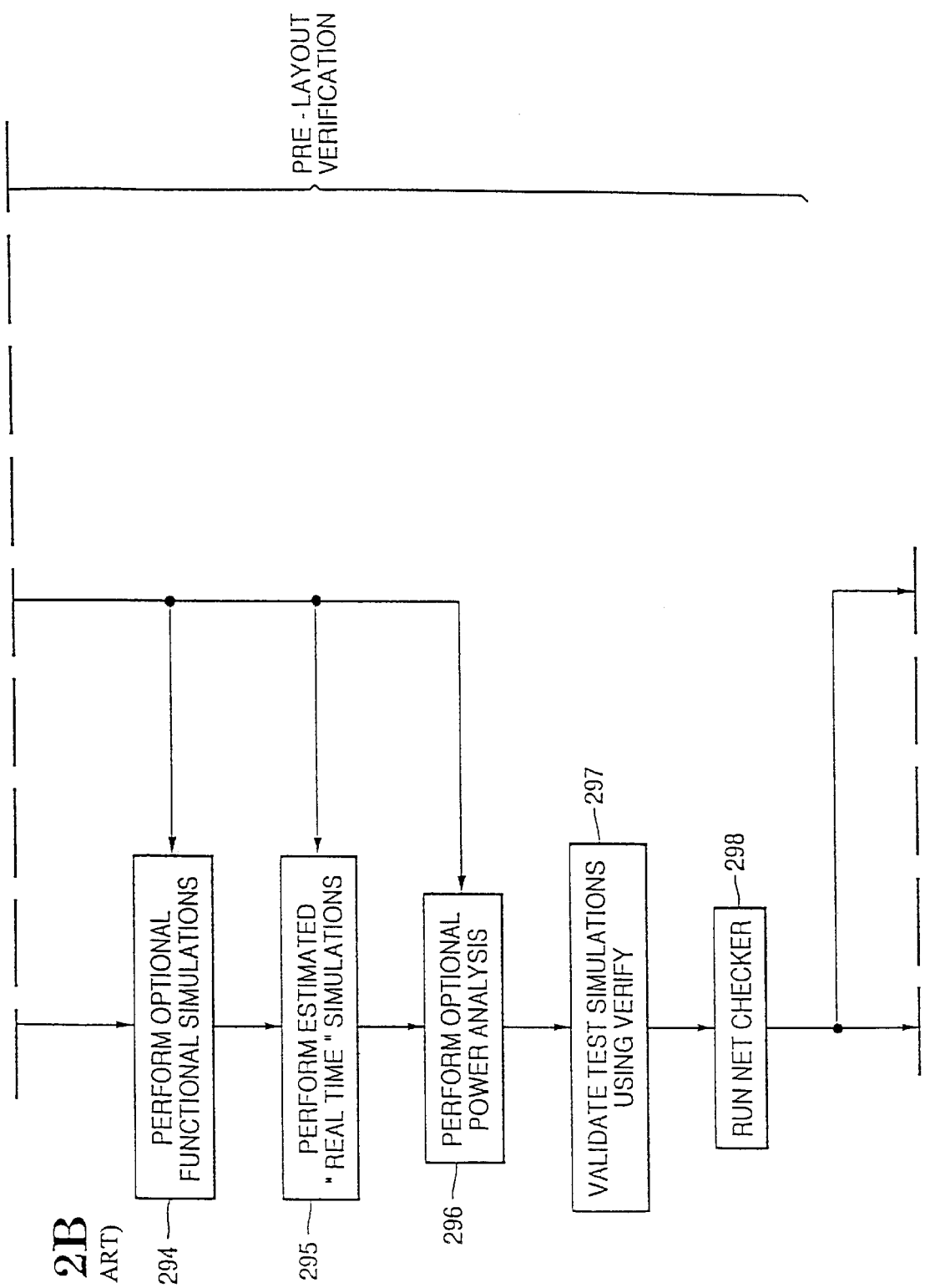
FIG. 2, which is comprised of FIG. parts 2A, 2B, and 2C, is a flow chart describing the standard approach common to the IC industry for designing and fabricating ASIC components.

While the invention is susceptible to various modifications and alternative forms, a specific embodiment thereof has been shown by way of example in the drawings and will herein be described in detail. It should be understood, however, that it is not intended to limit the invention to the particular form disclosed, but on the contrary, the invention is to cover all modifications, equivalents, and alternatives falling within the spirit and scope of the invention as defined by the appended claims.

ASIC DEVELOPMENT CYCLE OVERVIEW

FIG. 1 depicts an exemplary computer aided engineering (CAE) design system which utilizes the methods of the present invention in the design of application specific integrated circuits (ASICs). A user interacts with processes running on CAE design system 104 through operation of interactive user interface 102 over bus 150. CAE design system 104 exchanges information with mass storage subsystems 106, 108, and 110 over busses 152, 154, and 156 respectively. The information stored on the mass storage subsystems 106, 108, and 110 includes: standard cell and component library information describing the attributes and specifications of the standard cell components known to the CAE design system 104, pre-layout timing, surface area, and power target values for ASIC designs in process, and ASIC design output files describing ASIC designs and layouts for designs in process.

CAE design system 104 is preferably a general purpose computer such as a graphical workstation with programs and processes running in the CPU (not shown) which exchange information with a user to aid in the design and test of an ASIC layout. Typical processes include a design capture subsystem 120 which graphically interacts with a user to capture a description of the desired ASIC design. A user operates interactive user interface 102 to describe graphically and textually to the design capture subsystem 120 the desired ASIC function and layout. A user's description of a desired ASIC design is to be stored for later retrieval and further processing on mass storage subsystem 110. A power and delay estimation subsystem 122 is used to estimate the actual power dissipation or timing delays of an ASIC design for use by subsequent processes to analyze the design. Circuit layout subsystem 124 is used to physically layout the user's ASIC design in a geometry appropriate to the physical constraints of the intended IC package. This layout subsystem typically would embody the methods of the present invention described below. Finally a simulation and test subsystem 126 is used to evaluate and verify the functionality of the user's ASIC design and layout.

It is to be understood that the CAE design system 104 and associated elements in FIG. 1 are intended only to broadly suggest an architecture of an ASIC design system which may embody the methods of the present invention. One skilled in the art will readily recognize that many different structures and organizations of cooperating processes and design tools, and many different organizations and structure of stored information may be used to perform the desired ASIC design and layout functions. The system shown in FIG. 1 is only intended as one exemplary embodiment of such a design system which may advantageously employ the methods of the present invention.

Figure 2C:
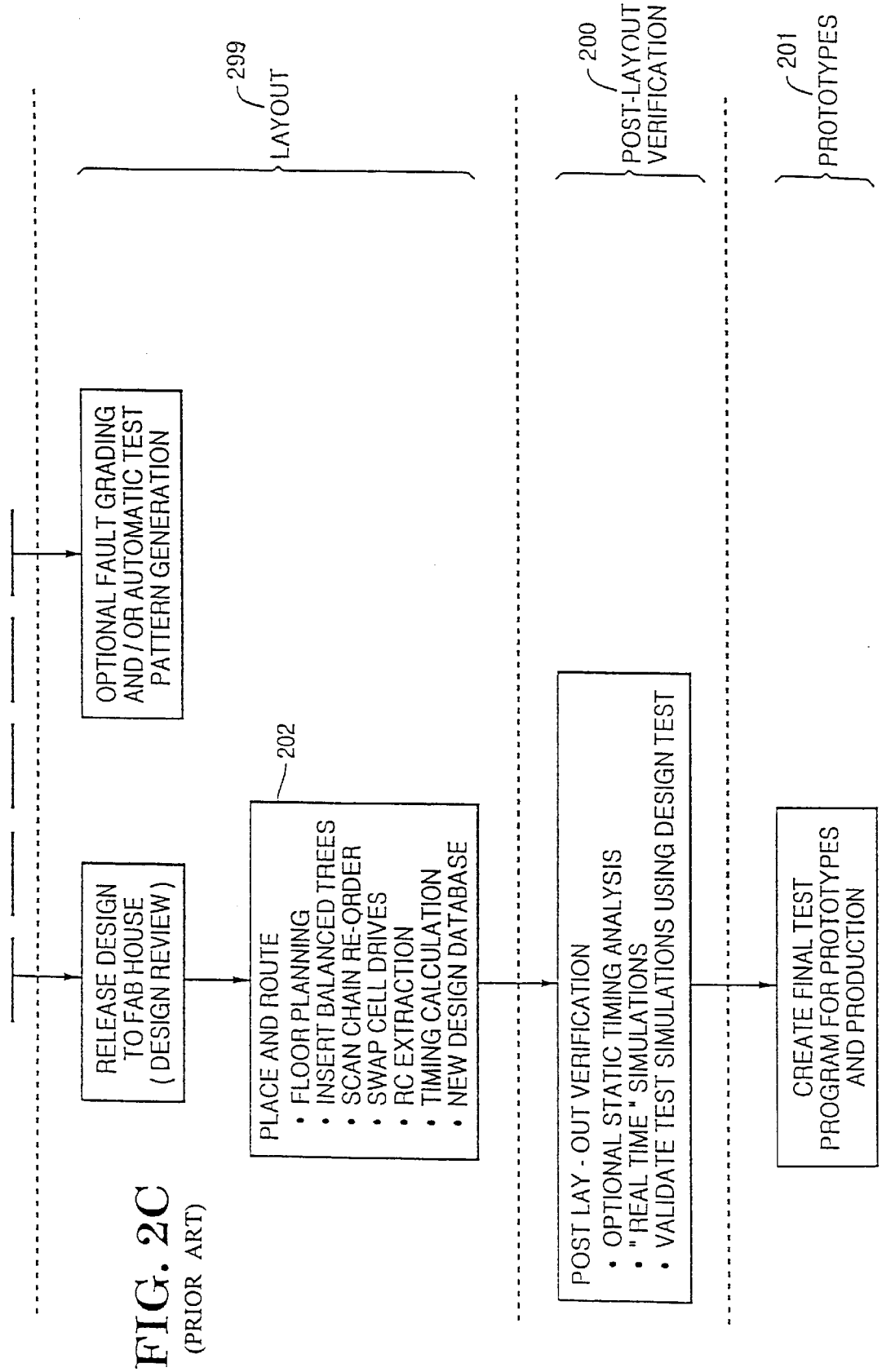

FIG. 2 depicts the overall flow of an ASIC design, layout, and fabrication process. The process typically includes steps performed by an ASIC designer and other steps performed by an IC chip fabricator or manufacturer. The designer and fabricator may be the same entity in some situations or may be distinct entities in other situations (e.g. a designer as the customer cooperating with a fabricator as a vendor). A typical ASIC design flow consists of several steps or phases, as described below with reference to FIG. 2. The customer/designer performs some steps while the chip fabricator/vendor performs others. Some steps described in FIG. 2 are performed manually while others are typically automated by the use of CAE design systems such as that of FIG. 1.

As shown in FIG. 2, the ASIC design, layout, and fabrication processes begin with element 290 by planning the design. Factors to consider include: the test strategy, target specifications (performance, package selection, and power), the functions to be integrated, and ASIC library selection. Architectural explorations may be performed with an HDL (Hardware Description Language). Analog functions are planned for at this time as well. Next, element 291 functions to enter the design using any combination of logic synthesis, conventional logic design and schematic entry, configured functions (e.g. memory functions, clock and global signal distribution tree analysis and/or I/O cell compilers), testability insertion techniques, instantiation of fabricator/vendor supplied re-usable logic functions (e.g. Application-Specific Function blocks, such as Ethernet or SCSI controllers), and reuse of logic from a previous design. Design entry is typically performed hierarchically, with different sections of the design verified individually before combination with other sections.

The combined operation of elements 292–298 performs pre-layout verification of the design's functionality and specifications, including timing. These elements typically include the following functions:

a. Element 292 performs optional static timing analysis with pre-layout estimated timings. This can quickly reveal gross timing violations, critical paths, etc., for both worst-case and best-case conditions (process, temperature, and voltage, plus the effect of estimated power dissipation).

b. Element 293 prepares for simulation by generating the input stimulus waveforms to be used to validate and test the design. Expected simulation results can optionally also be described.

c. Element 294 performs optional functional simulation with zero, unit, or approximate pre-layout timing delays and the input stimulus waveforms. Such simulations run much faster than those with full timings.

d. Element 295 performs estimated "real-time" simulations for both worst-case and best-case conditions using the input stimulus waveforms.

e. Element 296 performs optional power analysis using a set of input stimulus waveforms created for this purpose. If results differ significantly from earlier estimates, static timing analysis or estimated "real-time" simulations can be rerun with the new power figures.

f. Element 297 validates simulation results to be used in the test program for tester compatibility using the design test programs. This automates much of the generation of "at speed" test programs.

g. Element 298 runs a netlist checker to evaluate the design for conformance with established design rules and good design practices. This can also be done at earlier stages of the design cycle.

Another group of steps, collectively labeled element 299, performs the steps necessary to physically layout the ASIC in a geometry appropriate for the physical constraints of the IC package. As indicated, this is a common phase at which a designer passes the design descriptions (netlists, test data and results) to a cooperating fabrication associate or vendor. The fabrication process is the phase concerned with successfully packaging the intended functional design within the physical constraints of an available IC package. This element 299 determines device pinout information and constraints to help control timings during the layout process, such as clustering timing sensitive logic and critical path definition It is common to review the design at this phase to assure appropriate balance in the tradeoffs between physical constraints and operational constraints. Fault grading of test patterns and/or automatic test pattern generation can optionally be run prior to, or in parallel with, the layout process.

Element 202 within the layout process of element 299, places components and routes interconnections in the ASIC design. The chip fabricator/vendor performs floorplanning as required and runs the automatic place and route tools. The process takes into account any constraints supplied by the customer/designer. Balanced clock and global signal distribution trees are inserted in the layout. Scan chains are inserted in the layout. Scan chains are re-ordered to reduce interconnect loading and area. The methods of the present invention are typically invoked at this phase. Under operation of the methods of the present invention, the output drive levels of cells may be changed (swapped for functionally equivalent cells with different performance characteristics) to meet performance or surface area constraints and/or reduce power. Interconnect RC parasitics are extracted, the resulting post-layout timings calculated and returned to the customer/designer. A new design database reflecting tree insertion, new scan chain order, and changed (swapped) cell drives is also returned to the customer/designer. Additional checks of layout and electrical rules and connectivity are run after shipment of the post-layout files to the customer/designer.

Using the post-layout design database and timings supplied by the fabricator/vendor, the customer/designer performs post-layout validation 200 of the design's functionality and timings. This can optionally be done with static timing analysis, but must always be done with "real time" simulations. Worst-case and best-case simulations to be used in the test program are then validated for tester compatibility and converted to test patterns using design test tools. Finally, the fabrication process constructs prototype ASIC devices for evaluation and verification by the designer.

It is to be understood that the procedures described herein with respect to FIG. 2 are intended only as exemplary in nature. It will be recognized by one of ordinary skill in the art that many equivalent procedures, both manual and automated, may be adapted to the design, layout, and fabrication of an ASIC component. The flowchart of FIG. 2 is intended only to suggest a typical design/layout/fabrication procedure which may include the cell swapping methods of the present invention in the layout phase of the procedure.

Figure 3:
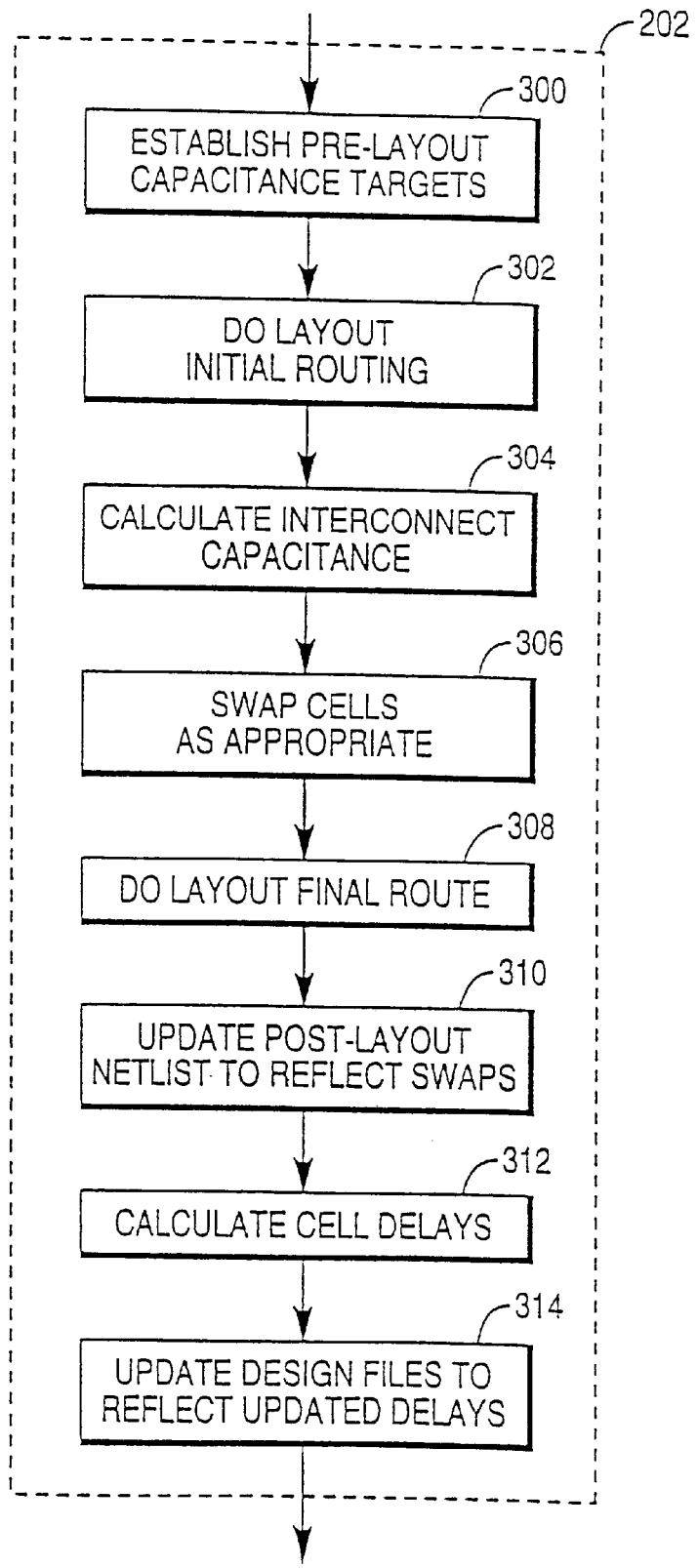
FIG. 3 is a flowchart which depicts more detail of an element of the flowchart in FIG. 2 which includes the methods of the present invention.

CELL SWAPPING METHOD OVERVIEW:

FIG. 3 depicts additional detail of the cell swapping methods of the present invention integrated within the layout process (element 202 of FIG. 2). Element 300 is operable to retrieve the pre-layout timing/capacitance values for all standard cell components within the users ASIC design. The pre-layout timing/capacitance timing target values are retrieved from the ASIC design output files stored on mass storage subsystem 110 of FIG. 1. Following layout initial routing performed by operation of element 302, element 304 can determine the actual interconnect timing/capacitance. The combination of the pre-layout timing/capacitance values and the interconnection timing/capacitance (in combination with signal generation and propagation delays internal to the standard cell component) fully determines the actual signal propagation timing for each timing arc associated with the standard cell component.

As used herein, a "timing arc" is a single conductive signal path from an input signal conductor of a standard cell component to an associated output signal conductor of a standard cell component. A "net" is a set of component input/output pins electrically connected to a common point without intervening circuit components. A "netlist" is the collection of one or more nets. The netlist fully describes the interconnections of all standard cell components in an ASIC design and layout.

Element 306 swaps standard cell components as appropriate to improve the ASIC layout with respect to the desired timing on each timing arc of the ASIC. Unlike prior CAE tools, this element of the present invention determines which components are to be swapped by evaluating the timing of the ASIC during the layout (placement and routing) of the ASIC design. This permits more accurate estimations of the actual timing requirements on each timing arc and reduces the need for re-iterations through earlier design phase elements of the ASIC design, layout, and fabrication process. Functionally equivalent standard cells are identified in the standard cell and component library files on mass storage subsystem 106 of FIG. 1. The processing of element 306 to determine standard cells swapping is discussed in additional detail below with respect to FIGS. 4–7.

Following the cell swapping operations of element 306, element 308 operates to finalize the interconnection conductor routing to adjust for any minor changes in the physical placement of a swapped standard cell circuit component.

Elements 310–312 operate to update the ASIC design description output files on mass storage subsystem 110 of FIG. 1. The ASIC design files are updated to reflect the update netlist for all swapped cells and to update the power and delay specifications of all swapped cells in the final layout of the ASIC. This features relieves the designer of the requirement to manually update the ASIC design to reflect changes made automatically by operation of cell swapping element 306 of layout element 202.

Figure 4:
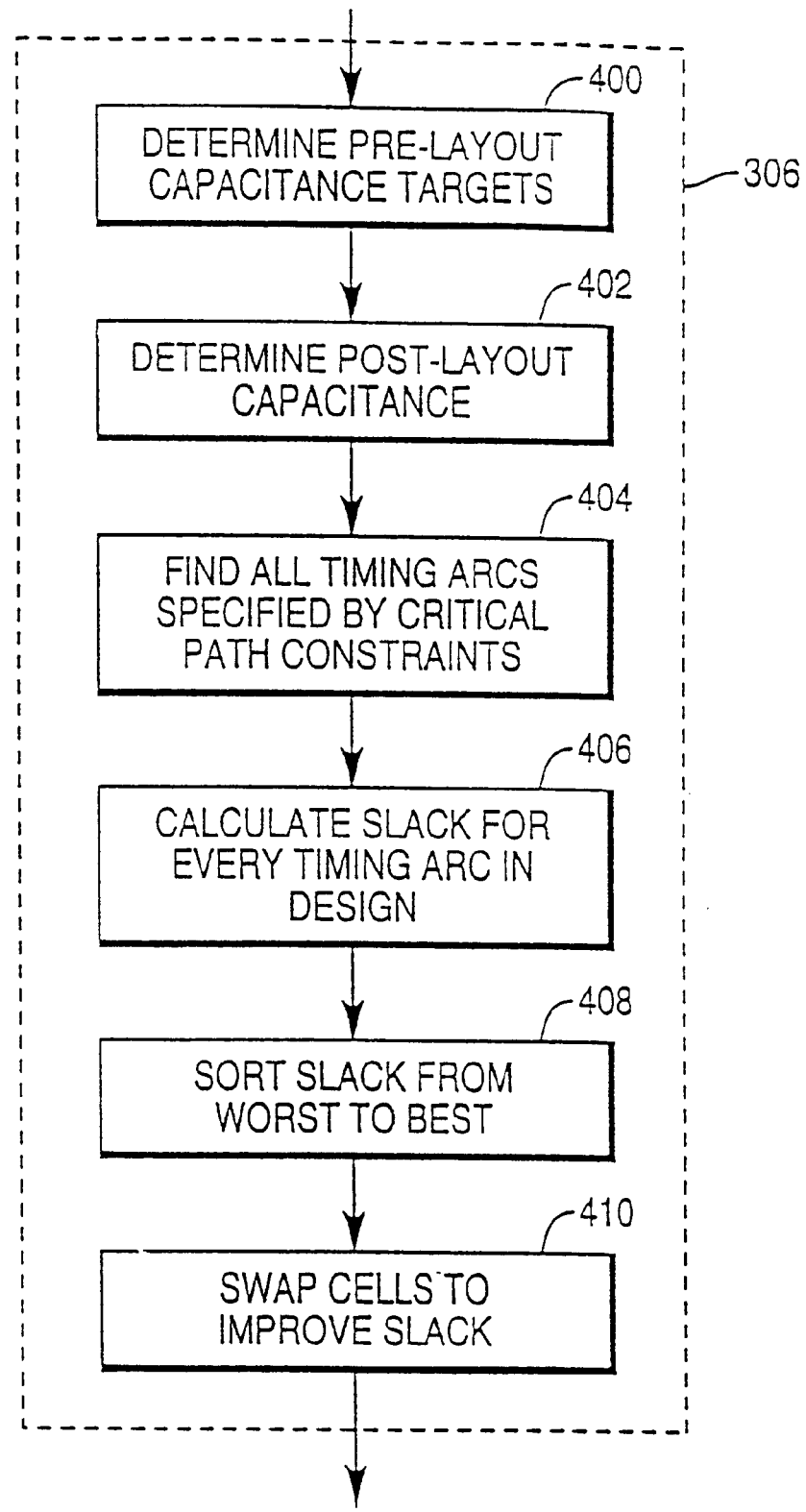
FIG. 4 is a flowchart which depicts more detail of an element of the flowchart in FIG. 3 which includes the methods of the present invention.

FIG. 4 provides additional detail regarding the operation of the cell swapping methods of the present invention as shown in element 306 of FIG. 3. Additional detail of some elements of FIG. 4 are discussed below with reference to FIGS. 5–7. Element 400 operates to determine pre-layout timing/capacitance target values for each timing arc in the ASIC layout. These target values, the values used by the design flow for the pre-layout timing analysis and simulation. Pre-layout timing/capacitance target values are pre-determined, as discussed above, during design phases of the ASIC design and layout process. Statistical defaults based on designs of similar size and complexity and modified by heuristics relating to the design, designer specifications, and designer critical path specifications are used to determine default pre-layout timing target values during the ASIC design phase. As discussed above, during the design phase, a designer may override these default timing target values for individual timing arcs or by specifying critical paths in the ASIC netlist. The pre-determined timing target values are retrieved by operation of element 400 from the design output files stored on mass storage subsystem 110 of FIG. 1. Element 402 is similarly operable to determine the post layout timing/capacitance of each timing arc of the ASIC layout by summing the loads internal to a standard cell circuit. Component with the actual interconnections timing/capacitance of an associated timing arc (as calculated above in element 304). Operation of elements 400 and 402 creates a list of timing arc entries with associated pre-layout timing target values and post-layout timing values.

Element 404 is operable to determine which timing arcs are part of a user specified critical path. Timing/capacitance target values derived from the user specified critical paths are merged with the list generated by operation of elements 400 and 402 above. Timing/capacitance target values derived from the user specified critical paths override the pre-layout timing/capacitance target values retrieved by operation of element 400. Operation of element 404 is discussed in additional detail below with reference to FIG. 5.

Element 406 next determines the timing slack for each entry on the list generated by operation of elements 400–404 above. The "timing slack" for a timing arc, as used herein, is defined to be the difference between the pre-layout timing target value and the post-layout timing value. A negative slack value indicates a timing violation which may render the ASIC inoperable while a positive (non-zero) value indicates an excessive timing margin which may indicate a loss of performance. The timing slack value for each timing arc entry on the list is stored in the corresponding entry for further processing. An optimum timing slack value for a timing arc is the smallest value greater than or equal to zero. Operation of element 406 is discussed in additional detail below with reference to FIG. 6.

Element 408 operates to sort the list of timing arc entries from worst margin (most negative timing slack value) to best margin (most positive timing slack value). Finally, element 410 operates to swap standard cell components in the ASIC layout for functionally equivalent standard cell circuit components which optimally improves the timing slack value on each timing arc in the sorted list of timing arcs. The optimum improvement is achieved by swapping a standard cell circuit component for a functionally equivalent which provides the optimum timing slack value. A positive timing slack value is always preferred over a negative timing slack value to prevent timing violations in the ASIC layout. If no positive timing slack value can be obtained by swapping any of the functionally equivalent standard cell circuit components, then the functionally equivalent standard cell circuit component having the smallest (closest to zero) negative timing slack value is preferred so as to minimize the magnitude of the likely timing violation on the corresponding timing arc. Processing of element 410 is discussed in further detail below with respect to FIG. 7.

By sorting the list of timing arcs according to timing slack values, the processing of element 410 is simplified. Any time operation of element 410 successfully optimizes a timing slack value for a particular timing arc, the associated standard cell circuit component is marked in the ASIC design output files as having been previously swapped. If another timing arc is encountered later in the list of timing arcs processed by element 410 for which the corresponding standard cell circuit component is marked as previously swapped, that timing arc may be skipped. Since the earlier cell swap improved another timing arc associated with the swapped cell which had a worse timing slack value, the latter arc may be skipped because it has been improved as much as necessary to eliminate any possible timing violation (otherwise it must have had worse timing slack than the earlier timing arc entry).

It will be noted by one of ordinary skill in the art that the identical goal of locating the optimum improvement in timing slack may be achieved without the need to sort the list of timing entries as discussed in the operation of elements 408 and 410. The method of the present invention is improved by the addition of a step to sort the list and therefore is disclosed herein as the best known mode at this time. Though variations of this method which exclude this sorting step may produce an equivalent result, the method disclosed herein is believed to operate faster than such alternative methods by reducing the number of iterations through the list of timing arcs.

Figure 5:
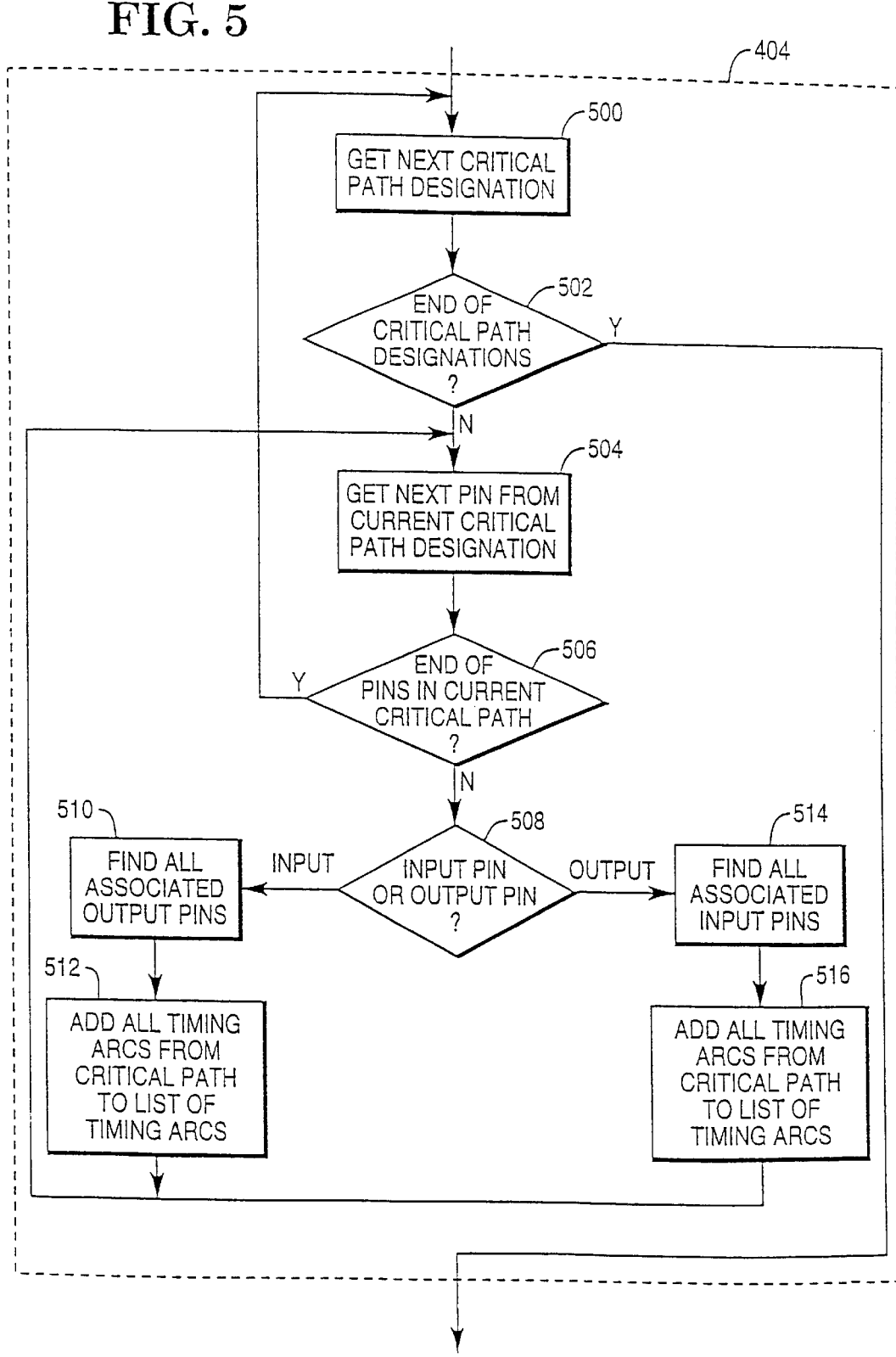
FIG. 5 is a flowchart which depicts more detail of an element of the flowchart in FIG. 4 which includes the methods of the present invention.

FIG. 5 describes additional detail regarding operation of element 404 to find all timing arcs defined by the designer's critical path specifications. A designer may specify overriding timing/capacitance target values with each timing arc in the ASIC design phase. In addition, many design capture subsystems permit the designer to specify certain critical paths for signal timing. A critical path specification usually defines a conductive path from an originating output signal conductor (output pin), through zero or more intermediate input/output signal conductors, to a final destination input signal conductor (input pin). The critical path so specified may incorporate one or more timing arcs as defined herein. The timing constraint for the critical path is used to derive the timing/capacitance constraints for each of the timing arcs on the list of timing arcs generated by operation of element 400. The timing target value for each timing arc derived from the critical path overrides any default timing target value defined during the design phase of the ASIC.

Elements 500 and 502 operate in combination to repeat the processing of elements 504–516 for each critical path designation specified by the designer. The critical path designations are specified by the designer and stored by other design tools in the ASIC design output files on mass storage subsystem 110 of FIG. 1. The next critical path designation is retrieved from the design files by element 500 until element 502 determines that all critical path designations have been processed. When all critical path designations have been processed, the operation of element 404 is complete. For each critical path retrieved from the ASIC design output files, elements 504–516 are operable to translate the information in the critical path designation into timing arc information to be added to the list of timing arcs in the ASIC layout. Processing continues with element 504.

Element 504 and 506 operate in combination to repeat the processing of elements 508–516 for each pin (or conductive path segment) of the critical path currently being processed (the current critical path last retrieved by operation of elements 500 and 502 above). Element 504 operates to locate the next pin or segment in the current critical path designation until operation of element 506 determines that all pins in the critical path designation have been processed. When element 506 determines that all pins in the current critical path have been processed, the method returns to processing at element 500 and 502 to retrieve another critical path designation as described above. For each pin in the current critical path located by operation of element 504, element 506 continues processing with elements 508–516.

Element 508 determines if the next pin specified is an input or output pin. As discussed above, a critical path designation is typically described by a sequence of conductive path segments from an output pin to a next input pin. To abbreviate the critical path description, it is common to describe an initial output pin and a final input pin while all intermediate pins are defined simply by an output pin or an input pin (rather than a pair of pins—one input pin and an associated output pin). In this abbreviated format, the methods of the present invention must determine the proper output pin associated with an intermediate input pin designation (or conversely the input pin associated with an intermediate output pin). Element 508 operate to determine if the current pin retrieved by operation of element 504 above is an input pin or an output pin. If element 508 determines that the current pin is an input pin, processing continue with elements 510 and 512. If element 508 determines that the current pin is an output pin, processing continues with elements 514 and 516.

Elements 510 and 512 operate to determine all timing arcs associated with a specified input pin which are relevant to the current critical path retrieved by operation of element 500. Element 510 locates all relevant timing arcs by inspecting the netlist in the ASIC design output files to find all output pins associated with the current input pin. The output pin so located which is also known to be on the current critical path is determined to be the opposing pin of the relevant timing arc. Element 512 operates to add all relevant timing arcs so located to the list of timing arcs generated by operation of element 400. The timing target value for the relevant timing arcs is derived, as discussed above, from the timing specifications provided by the designer in designating the critical path. Processing of the current pin is then completed and the method continues with element 504 to retrieve another pin from the current critical path designation.

Elements 514 and 516 operate identically to elements 510 and 512, respectively, but locate an input put pin associated with the current output pin retrieved by operation of element 504.

Further details of the processing of critical path designations provided by the ASIC designer, for purposes of extracting timing arcs and associated timing target values, are well known to those of ordinary skill in the art. The precise processing will depend on the actual syntactic format of the critical path designation and therefore depends on the CAE design tool used to define the critical path designations. One of ordinary skill in the art will recognize that there exist many equivalent variations of the method described above with reference to element 404 and FIG. 5.

Figure 6:
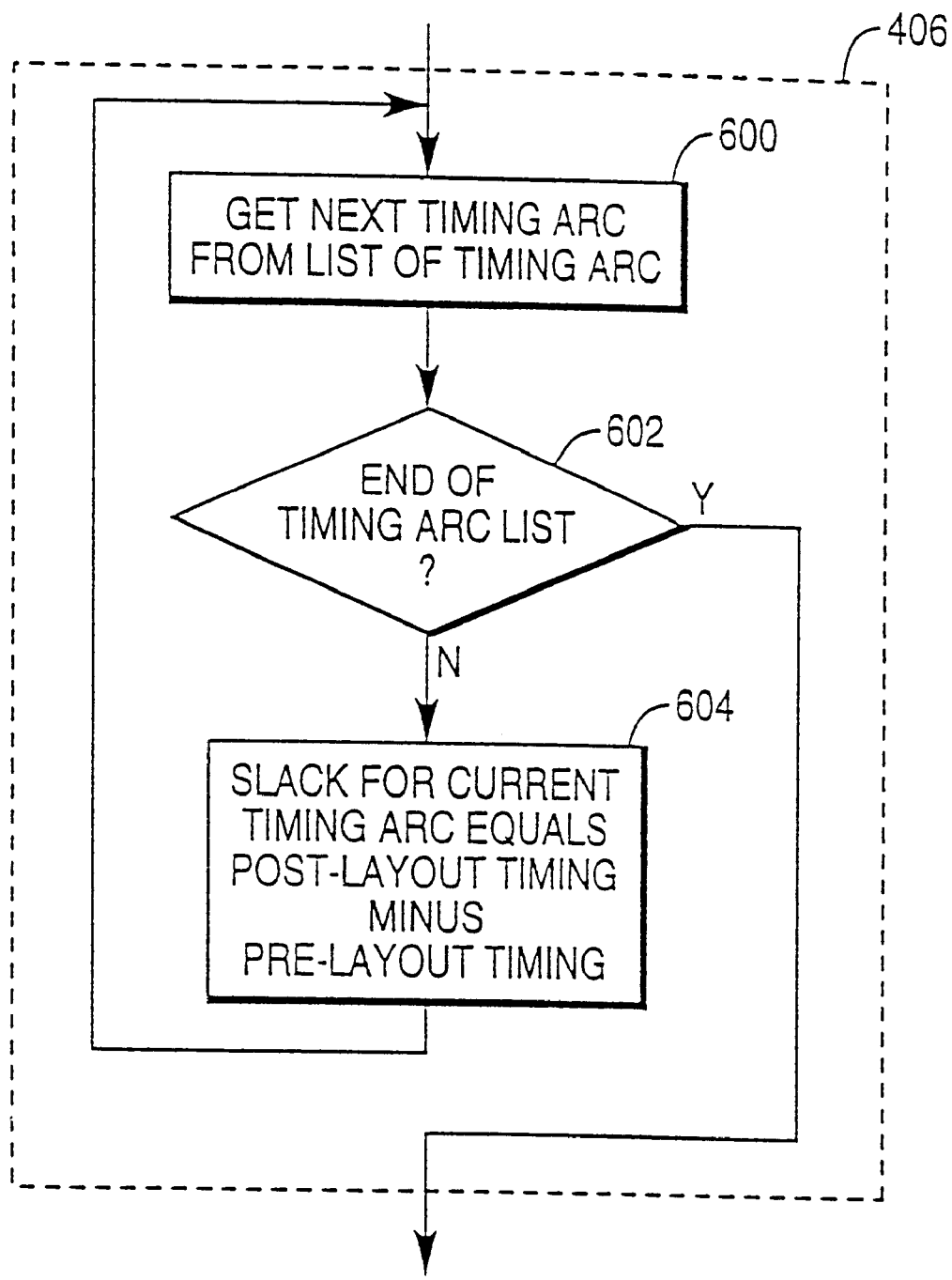
FIG. 6 is a flowchart which depicts more detail of an element of the flowchart in FIG. 4 which includes the methods of the present invention.

FIG. 6 depicts additional detail regarding operation of element 406 of FIG. 4. Element 406 is operable to compute a timing slack value for every timing arc on the list created by operation of elements 400–404 of FIG. 4. The "timing slack" for a timing arc, as used herein and discussed above, is defined to be the difference between the pre-layout timing target value and the post-layout timing value. A negative slack value indicates a timing violation which may render the ASIC inoperable while a positive (non-zero) value indicates an excessive timing margin which may indicate a loss of performance. An optimum timing slack value for a timing arc is the smallest positive value greater than or equal to zero. Elements 600 and 602 operate in combination to retrieve every timing arc from the list for further processing by element 604. Element 600 retrieves the next timing arc entry from the list of timing arc entries. When element 602 determines that there are no further list entries to be processed, operation of element 406 is completed. Otherwise, the current element, last retrieved by operation of element 600, is processed by operation of element 604.

Element 604 is operable to calculate a timing slack value for the current timing arc list entry. The timing slack is determined by subtracting the pre-layout timing target value from the post-layout timing values generated after the completion of layout placement and routing of the ASIC. The timing slack value is stored in the list entry for further processing in the method of the present invention.

Figure 7A:
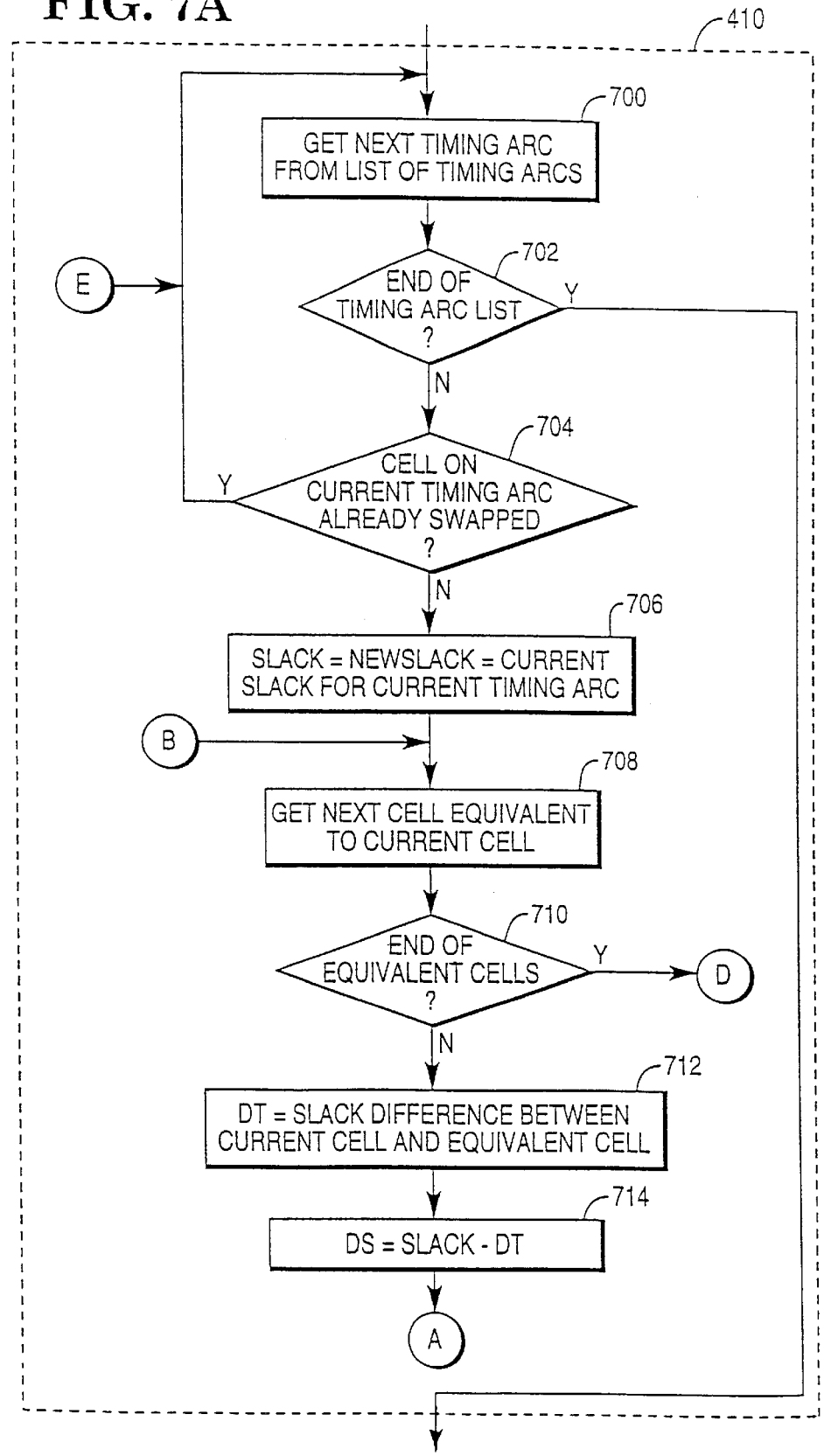
FIG. 7, which is comprised of FIG. parts 7A, 7B, and 7C, is a flowchart which depicts more detail of an element of the flowchart in FIG. 4 which includes the methods of the present invention.
Figure 7B:
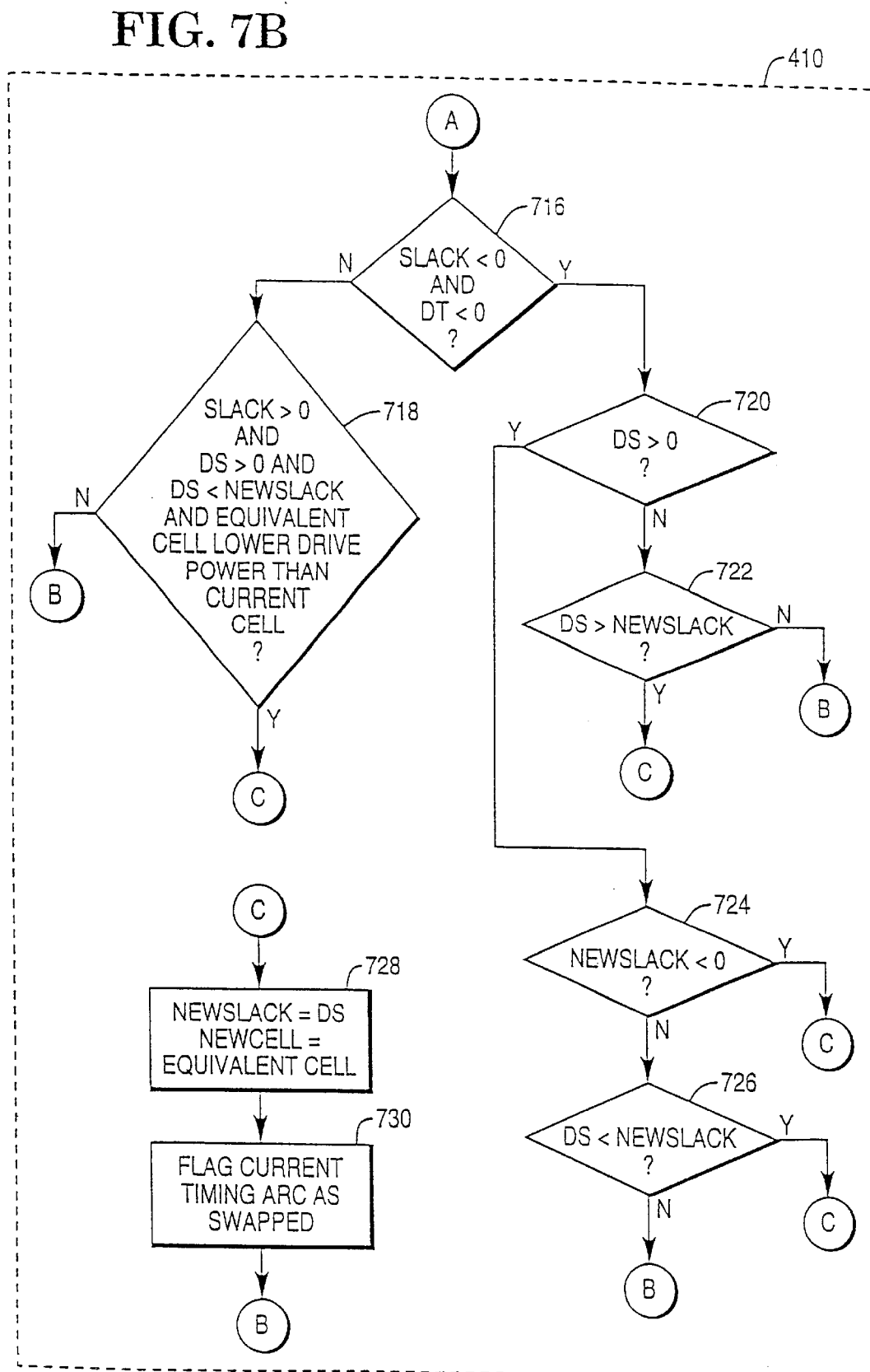
Figure 7C:
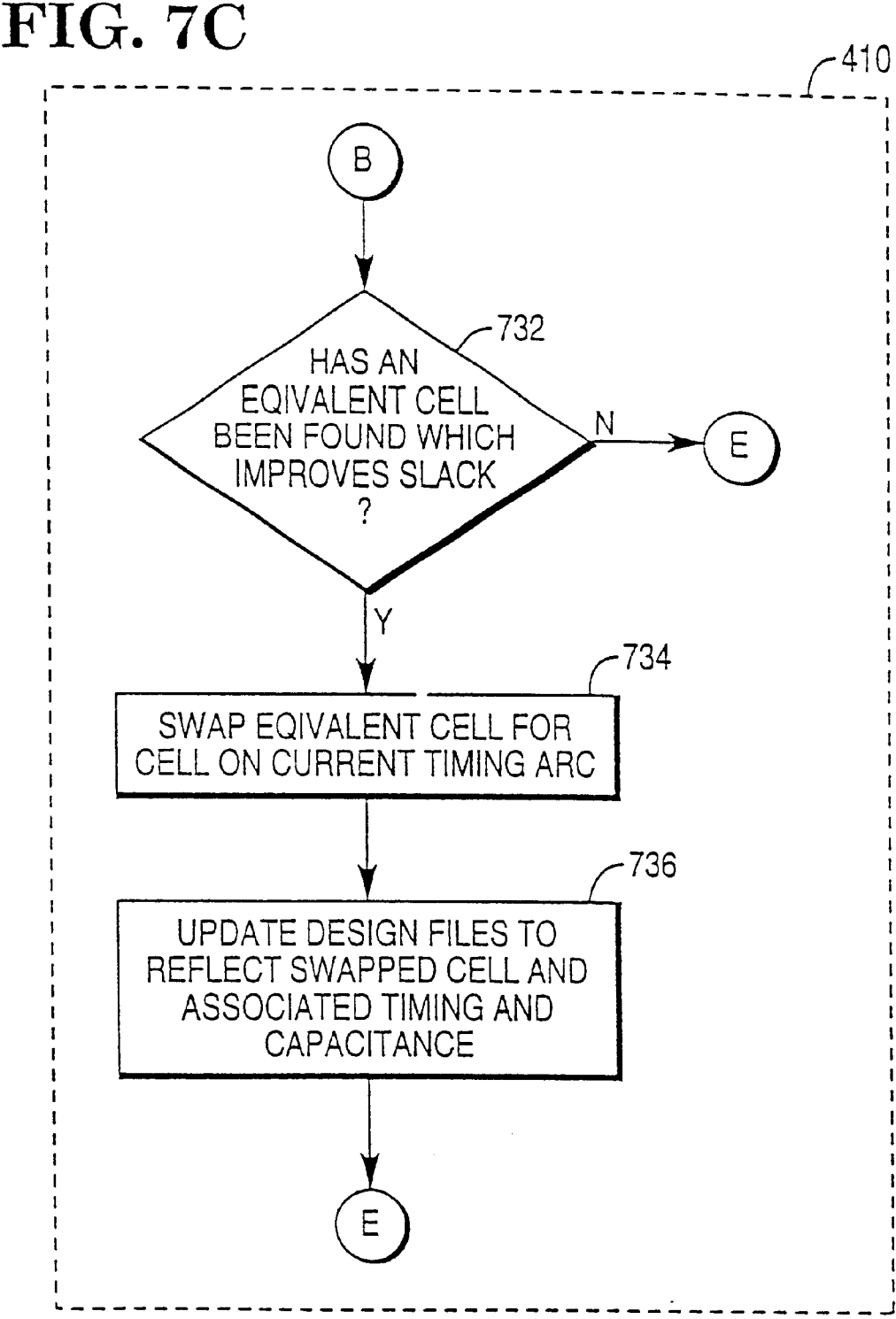

CELL SWAPPING METHOD DETAIL:

FIG. 7 is comprised of parts: namely FIGS. 7A, 7B, and 7C. FIG. 7 depicts additional detail of the operation of element 410 of FIG. 4. Element 410 is operable to swap the standard cell associated with the output pin of a timing arc to improve the timing slack of signals applied to that timing arc in the ASIC layout. Elements 700 and 702 operate in combination to process each timing arc on the sorted list generated by operation of element 408. For each element in the sorted list of timing arc entries, elements 704–736 process the entry to determine what if any standard cell circuit component swap is appropriate. Element 700 retrieves the next timing arc entry from the sorted list. Each entry, as discussed above, includes information pertaining to the pre-layout timing target value, the post-layout timing value, and the timing slack value for each timing arc in the ASIC layout. As discussed above with respect to element 408, the list is sorted from worst margin (negative timing slack value) to best margin (positive timing slack value). Element 702 determines when there are no more timing arc entries to be processed. When all entries are processed, the processing of element 410 is complete (marked with the label "D"). For each entry retrieved from the list by operation of element 700, processing continues at element 704 with the "current entry" representing the entry has retrieved from the sorted list by operation of element 700.

Element 704 whether the standard cell associated with the output pin of the current timing arc entry has previously been swapped by an earlier iteration of the processing of elements 704–736. If the cell has been previously swapped, there is no need for further processing of this entry and processing continues at element 700 to retrieve the next entry from the sorted list of timing arc entries. If the cell associated with the current timing arc entry has not been previously swapped, processing continues with element 706.

As discussed above, the optimum improvement is achieved by swapping a standard cell circuit component for a functionally equivalent with a smaller timing slack value. A positive timing slack value is always preferred over a negative timing slack value to prevent timing violations in the ASIC layout. If no positive timing slack value can be obtained by swapping any of the functionally equivalent standard cell circuit components, then the functionally equivalent standard cell circuit component having the smallest (closest to zero) negative timing slack value is preferred so as to minimize the likely timing violation on the corresponding timing arc.

By sorting the list of timing arcs according to timing slack values, the method simplifies the processing of element 410. If the standard cell associated with the current entry has already been swapped, then a previous iteration through elements 704–736 has already improved the timing slack for a timing arc also associated with the standard cell of the current entry and having a worse margin. Since the earlier swap improved a timing arc which had a worse timing slack value, this latter arc, the arc represented by the current entry, may be skipped because it has been improved as much as necessary to eliminate any possible timing violation (otherwise it must have had worse timing slack than the earlier timing arc entry). The increase in the margin for the current entry is a side effect of swapping the cell to improve another timing arc encountered earlier in processing the sorted list of timing arc entries.

It will be noted by one of ordinary skill in the art that the identical goal of locating the optimum improvement in timing slack may be achieved without the need to sort the list of timing entries as discussed in the operation of elements 408 and 410. The method is improved by the addition of a step to sort the list and therefore is disclosed herein as the best known mode at this time. Though variations of this method without the step of sorting the list of timing arcs may produce an equivalent result, the method disclosed herein is believed to be perform better than such alternative methods. Element 706 computes temporary variables SLACK and NEWSLACK to the timing slack value for the current timing arc entry. These temporary variables are used in the analysis of each possible functionally equivalent standard cell circuit component to determine which (if any) most improves the timing slack for the timing arc of the current entry. SLACK is the timing slack of the current cell associated with the current timing arc entry, and NEWSLACK is the timing slack value of the optimum equivalent cell thus far analyzed by operation of elements 708–730 discussed below.

Elements 708 and 710 operate in combination to retrieve and analyze each standard cell circuit component which is functionally equivalent to the standard cell circuit component associated with the current timing arc entry. Element 708 retrieves the next functionally equivalent cell from the cell library stored on mass storage subsystem 106 of FIG. 1. The details of retrieval of each equivalent standard cell from the cell library is a matter of design choice dependent upon the structure of the cell library on mass storage subsystem 106 and is readily determined by one of ordinary skill in the art. Element 710 operates to determine whether there are no more equivalent cells to be processed. When all equivalent cells are processed, the method of element 410 continues processing at element 730 (marked with the label "E") to perform the swap if an appropriate equivalent cell was located. For each equivalent cell retrieved from the cell library by operation of element 708, elements 712–730 perform further processing to evaluate the timing slack improvement of the equivalent cell over the current cell. Processing continues at element 712 with the "equivalent cell" representing the equivalent cell last retrieved from the cell library by operation of element 708 and the "current cell" representing the standard cell currently associated with the current timing arc entry.

Elements 712 and 714 compute two temporary values used to evaluate the possible improvement in timing slack caused by swapping the equivalent cell for the current cell. DT is the difference in timing slack if the equivalent cell were swapped for the current cell and DS is the new timing slack value if the equivalent cell were swapped for the current cell. Processing continues with element 716 (labeled "A") to determine if the equivalent cell provides the most improvement in slack of the equivalent cells evaluated thus far in the iterative processing of elements 712–730.

Elements 716–726 are operable to implement a decision tree for determining whether the timing slack (DS) for the equivalent cell provides the optimum improvement possible for the timing slack of the current cell. Element 716 first determines whether the equivalent cell is a possible swap to increase the timing slack over that of the current cell (a swap UP), or a possible swap to decrease the timing slack over that of the current cell (a swap DOWN). If SLACK (timing slack of the current cell) is positive or (DT) the timing slack change is positive, then the equivalent cell is a possible swap DOWN of the timing slack of the current cell and processing continues with element 718. Otherwise, (i.e. SLACK is negative and DT is negative), the equivalent cell is a possible swap UP of the timing slack of the current cell and processing continues with element 720.

CELL SWAP DOWN:

Element 718 determines whether the equivalent cell will in fact reduce the timing slack of the current cell. If SLACK is positive, DS is positive, and DS is less than NEWSLACK (the timing slack of the previously optimum equivalent cell), and the equivalent cell has a lower drive power than the current cell, then the equivalent cell is the optimum cell thus far processed which improves the timing slack of the current timing arc entry and processing continues with element 728 (labeled "C") to tentatively swap the equivalent cell for the current cell. Otherwise, the equivalent cell does not improve the timing slack of the current cell and processing continues with element 708 (labeled "B"). In other words, if, neither the equivalent cell nor the current cell cause a timing violation, and the equivalent cell provide more improvement (reduction) of the timing slack than any previous equivalent cell thus far processed, then the equivalent cell is the optimum functionally equivalent cell thus far processed and may be tentatively swapped for the current cell by continuing processing at element 728 (labeled "C"). Otherwise, the equivalent cell will not be swapped for the current cell and processing continues with element 708 (labeled "B") to evaluate the next equivalent cell. Under rare circumstances it is possible that a cell swap down on a latter timing arc may create a timing violation in an earlier timing arc for which no swap was possible. Though this could occur in the method as disclosed herein, it would be obvious to one of ordinary skill in the art to modify the method to prevent such an occurrence. The likelihood of such an occurrence in the real design of practical ASIC devices is so low that the added complexity of such a modifications likely does not outweigh the potential benefit from the modifications. In either case, such a modification to the above method is a simple matter of design choice in implementing the methods of the present invention.

CELL SWAP UP:

Element 720 continues the decision tree processing following operation of element 716 determining that the equivalent cell is a possible swap UP to increase timing slack and thereby eliminate a timing violation (SLACK is negative indicating a timing violation and DT is negative indicating a possible swap UP may eliminate the violation. Element 730 determines whether the swap UP of the equivalent cell for the current cell is sufficient to eliminate the timing violation. If DS is positive (timing slack of the equivalent cell does not violate the pre-layout timing target values), then processing continues with element 724 to further evaluate the equivalent cell for a possible swap UP to eliminate a timing violation. Otherwise, if the equivalent cell does not eliminate the timing violation, processing continues with element 722 to determine if it is the best improvement evaluated thus far. Element 722 determines if the equivalent cell provides the optimum improvement of the equivalent cells evaluated thus far by operation of elements 708–730. If DS (the timing slack of the equivalent cell) is greater than NEWSLACK (the timing slack value of the previously evaluated optimum equivalent cell), then processing-continues with element 728 (labeled "C") to tentatively swap the equivalent cell for the current cell. Though the equivalent cell does not eliminate the timing violation, it does provide the optimum improvement toward that goal. Otherwise, if the equivalent cell does not eliminate the timing violation and does not provide the optimum improvement in toward that goal, then processing continues with element 708 (labeled "B") to evaluate another equivalent cell.

Element 724 continues the decision tree processing after element 720 determines that the equivalent cell eliminates a timing violation of the current cell. Element 724 determines whether a previously evaluated cell was selected to provide the optimum improvement toward eliminating a timing violation without totally eliminating the violation. If NEWSLACK is negative, so indicating that a previously evaluated equivalent cell was tentatively swapped for the current cell to improve but not eliminate a timing violation then processing continues with element 728 (labeled "C") to tentatively swap the equivalent cell for the current cell. Otherwise, processing continues with element 726 which determines whether the equivalent cell is the smallest improvement which eliminates the timing violation of the current cell. The smallest improvement which eliminates a timing violation is the optimum improvement. If DS (the timing slack value for the equivalent cell) is less than NEWSLACK (the timing slack value for a previously optimum equivalent cell), then processing continues with element 728 (labeled "C") to tentatively swap the equivalent cell for the current cell. Otherwise, if the equivalent cell eliminates the timing violation but is not optimum in so doing, then processing continues with element 708 (labeled "B") to retrieve another equivalent cell for evaluation by elements 708–730.

Elements 728 and 730 tentatively swap the equivalent cell for the current cell. NEWSLACK is set to DS to represent the timing slack value for the equivalent cell as the optimum improvement among all equivalent cells thus far evaluated by processing of elements 708–730. In addition, a temporary variable NEWCELL is set to a value indicative of the equivalent cell to eventually be permanently swapped for the current cell. Finally, element 730 sets a temporary variable to indicate that a permanent swap will be made after all equivalent cells have been evaluated to determine the optimum improvement for timing slack for the current timing arc entry. Processing continues with element 708 (labeled "B") to retrieve and evaluate the next equivalent cell for the current cell of the current timing arc entry.

Element 732–736 operate in combination to make a previous tentative swap permanently recorded in the ASIC design and layout. Element 732 determines whether the temporary variable was set by operation of element 730 above to indicate that an optimum equivalent cell has been located which should be permanently swapped for the current cell in the ASIC design and layout output files. If the flag so indicates that a permanent swap should be made, processing continues with element 734. Otherwise, processing continues with element 700 (labeled "F") to retrieve the next timing arc entry from the sorted list and to initiate processing thereon.

Elements 734 and 736 operate to update the ASIC design output files to reflect the swap of the equivalent cell indicated by the variable NEWCELL for the current cell associated with the current timing arc entry. The netlist, timing, capacitance, part identification information, and other design related information in the ASIC design files is updated to reflect the new equivalent cell substituted for the pre-layout selected standard cell. In addition, the new standard cell associated with the current timing arc is marked as having been previously swapped to reduce the processing of the method as discussed above with reference to element 704. Processing then continues with element 700 (labeled "F") to retrieve the next timing arc entry from the sorted list and to initiate processing thereon.

It will be noted by those of ordinary skill in the art that the structure of the cell library stored on mass storage subsystem 106 influences the design of the processing loop discussed above with reference to elements 708–730. The cell library may represent equivalent standard cells in a variety of structures and sorted orders. It will be apparent to those skilled in the art that sorting the equivalent cells within the cell library with respect to output signal timing could reduce the need to evaluate each equivalent cell. Depending on the type of swap required, swap UP or swap DOWN, a sorted list of equivalent cells could be evaluated from fastest to slowest or vice versa such that the evaluation of equivalent cells to locate the optimum improvement could be curtailed. When evaluating equivalent cells to locate a cell which eliminates a timing violation, the first cell which is fast enough to eliminate the violation will be optimum. Conversely, when evaluating equivalent cells to locate a cell which reduces a large timing slack value, the cell evaluated which proceeds the first cell which is slow enough to create a timing violation will be optimum. This is a matter of design choice given the constraints of the cell library structure stored on mass storage subsystem 106. In addition, since the number of equivalent cells is usually small, the improvement in performance of the above described methods will likely be minimal.

The methods of the present invention are primarily directed toward optimization of the timing slack and hence the timing related performance of the ASIC. In the process of optimizing the timing slack, power dissipation is usually decreased as well as a secondary effect. It will be readily apparent to those of ordinary skill in the art that the methods illustrated and described in detail above can be similarly applied to the optimization of an ASIC design and layout with primarily respect to other parameters of the ASIC design and layout. Specifically, the methods of the present invention can be applied to optimize an ASIC layout primarily to minimize layout area or to minimize power dissipation of the ASIC layout.

While the invention has been illustrated and described in detail in the drawings and foregoing description, such illustration and description is to be considered as exemplary and not restrictive in character, it being understood that only the preferred embodiment has been shown and described and that all changes and modifications that come within the spirit of the invention are desired to be protected.

What is claimed is:

1. A method for improving the timing performance of an ASIC layout, said ASIC having at least one standard cell circuit component and at least one timing arc associated with said standard cell circuit component, said method comprising the steps of:

placing all circuits in the ASIC layout;

routing all timing arcs in the ASIC layout;

generating a pre-layout timing target value for a timing arc of said ASIC automatically based on historical statistical information regarding the ASIC layout before said placing and routing steps;

determining a post-layout timing value for said timing arc after said placing and routing steps;

calculating a timing slack value for said timing arc by subtracting said post-layout timing value from said pre-layout timing target value;

repeating said generating a pre-layout timing, determining a post-layout timing and calculating a timing slack value steps for each timing arc of each standard cell circuit component in order to generate a list of at least one timing slack value which corresponds to each timing arc;

determining a timing difference between the standard cell circuit component associated with a timing arc in said list and at least one logically equivalent second standard cell circuit component;

calculating a slack change value by subtracting said timing difference from the timing slack value associated with the said timing arc in said list;

repeating said determining a timing difference and calculating a slack change value steps for each second standard cell circuit component logically equivalent to said standard cell circuit component;

identifying which said slack change value, calculated by operation of said step of repeating said determining a timing difference and calculating a slack change value steps, most improves performance of said ASIC with respect to said timing arc on said list in order to generate an optimum timing slack value;

swapping said standard cell circuit component associated with said timing arc on said list with the second standard cell circuit component associated with said optimum timing slack value to improve timing performance of said ASIC layout; and repeating said steps of determining a timing difference, calculating a slack change value, repeating said determining a timing difference and calculating a slack change value steps for each second standard cell circuit component, identifying, and swapping for each timing arc on said list.

2. The method of claim 1:

wherein said step of repeating said generating, determining and calculating steps further comprises the step of sorting said list in ascending numerical order of said timing slack values;

wherein said swapping step further comprises the step of noting that said timing arc associated with said second standard cell circuit component is associated with a swapped component; and wherein said step of repeating said determining, calculating, repeating, identifying, and swapping steps further comprises the steps of:

determining whether said timing arc on said list is noted to be associated with a swapped component, and skipping the step of repeating said determining, calculating, repeating, identifying, and swapping steps for said timing arc on said list determined to be associated with a swapped component.

3. The method of claim 1 further comprising the step of overriding one or more of said automatically generated pre-layout timing target value by entering a replacement pre-layout timing target value for any timing arc.

4. A method for improving the performance of an ASIC layout with respect to a predetermined parameter, said ASIC having at least one standard cell circuit component and at least one timing arc associated with said standard cell circuit component, said method comprising the steps of:

placing all circuits in the ASIC layout;

routing all timing arcs in the ASIC layout;

generating a pre-layout timing target value for a timing arc of said ASIC automatically based on historical statistical information regarding the ASIC layout before said placing and routing steps;

determining a post-layout timing value for said timing arc after said placing and routing steps;

calculating a performance slack value for said timing arc by subtracting said post-layout timing value from said pre-layout timing target value;

repeating said generating a pre-layout timing target value, determining a post-layout timing value and calculating a performance slack value steps for each timing arc for each standard cell circuit component in order to generate a list of at least one performance slack value which corresponds to each timing arc;

determining a performance difference between the standard cell circuit component associated with a timing arc in said list and at least one logically equivalent second standard cell circuit component;

calculating a slack change value by subtracting said performance difference from the performance slack value associated with the said timing arc in said list;

repeating said determining a performance difference and calculating a slack change value steps for each second standard cell circuit component logically equivalent to said standard cell circuit component;

identifying which said slack change value calculated by operation of said step of repeating said determining a performance difference and calculating a slack change value steps, most improves performance of said ASIC with respect to said predetermined parameter of said timing arc on said list in order to generate an optimum performance slack value;

swapping said standard cell circuit component associated with said timing arc on said list with the second standard cell circuit component associated with said optimum performance slack value to improve performance of said ASIC layout with respect to said predetermined parameter; and repeating said steps of determining a performance difference, calculating a slack change value, repeating said determining a performance difference and calculating a slack change value steps for each second standard cell circuit component, identifying, and swapping for each timing arc on said list.

5. The method of claim 4:

wherein said step of repeating said generating, determining and calculating steps further comprises the step of sorting said list in ascending numerical order of said performance slack values;

wherein said swapping step further comprises the step of noting that said timing arc associated with said second standard cell circuit component is associated with a swapped component; and wherein said step of repeating said determining, calculating, repeating, identifying, and swapping steps further comprises the steps of:

determining whether said timing arc on said list is noted to be associated with a swapped component, and skipping said step of repeating said determining, calculating, repeating, identifying, and swapping steps for said timing arc on said list determined to be associated with a swapped component.

6. The method of claim 4 wherein said predetermined parameter is the capacitive load of said timing arc.

7. The method of claim 4 wherein said predetermined parameter is the timing of signals on said timing arc.

8. The method of claim 4 wherein said predetermined parameter is the power dissipation on said timing arc.

9. A method of improving the timing performance of an ASIC layout, said ASIC having at least one standard cell circuit component and at least one timing arc associated with said standard cell circuit component, said method comprising the steps of:

placing all circuits in the ASIC layout;

routing all timing arcs in the ASIC layout;

generating a pre-layout timing target value for a timing arc of said ASIC automatically based on historical statistical information regarding the ASIC layout before said placing and routing steps;

determining a post-layout timing value for said timing arc after said placing and routing steps;

comparing the pre-layout timing target value for each timing arc with the post-layout timing value for each timing arc;

selecting a second standard cell circuit component logically equivalent to the standard cell circuit component associated with each timing arc, wherein said second standard cell component improves the timing performance of each timing arc; and swapping each second standard cell component selected by operation of said selecting step with the standard cell circuit component associated with each timing arc.

10. The method of claim 9 further comprising the step of overriding one or more of said automatically generated pre-layout timing target value by entering a replacement pre-layout timing target value for any timing arc.

11. A method for improving the performance of an ASIC layout with respect to a predetermined parameter, said ASIC having at least one standard cell circuit component and at least one timing arc associated with said standard cell circuit component, said method comprising the steps of:

placing all circuits in the ASIC layout;

routing all timing arcs in the ASIC layout;

generating a pre-layout performance target value for a timing arc of said ASIC automatically based on historical statistical information regarding the ASIC layout before said placing and routing steps;

determining a post-layout performance value for said timing arc after said placing and routing steps;

comparing the pre-layout performance target value for each timing arc with the post-layout performance value for each timing arc;

selecting a second standard cell circuit component logically equivalent to the standard cell circuit component associated with each timing arc, wherein said second standard cell component improves the performance of each timing arc with respect to said predetermined parameter; and swapping each second standard cell component selected by operation of said selecting step with the standard cell circuit component associated with each timing arc.

12. The method of claim 11 wherein said predetermined parameter is the capacitive load of said timing arc.

13. The method of claim 11 wherein said predetermined parameter is the timing of signals on said timing arc.

14. The method of claim 11 wherein said predetermined parameter is the power dissipation on said timing arc.

15. The method of claim 11 further comprising the step of overriding one or more of said automatically generated pre-layout performance target value by entering a replacement pre-layout performance target value for any timing arc.

16. A method for improving the performance of an ASIC layout with respect to a predetermined parameter, said ASIC having at least one circuit component and at least one timing arc associated with said at least one circuit component said method comprising the steps of:

placing all circuits in the ASIC layout;

routing all timing arcs in the ASIC layout;

generating a pre-layout timing target value for a timing arc of said ASIC automatically based on historical statistical information regarding the ASIC layout before said placing and routine steps;

determining a post-layout timing value for said timing arc after said placing and routing steps;

calculating a performance slack value for said timing arc by subtracting said post-layout timing value from said pre-layout timing target value;

repeating said generating a pre-layout timing target value, determining a post-layout timing value and calculating a performance slack value steps for each timing arc for each circuit component in order to generate a list of at least one performance slack value which corresponds to each timing arc;

determining a performance difference between the circuit component associated with a timing arc in said list and at least one logically equivalent second circuit component;

calculating a slack change value by subtracting said performance difference from the performance slack value associated with the said timing arc in said list;

repeating said determining a performance difference and calculating a slack change value steps for each second circuit component logically equivalent to said circuit component;

identifying which said slack change value,calculated by operation of said step of repeating said determining a performance difference and calculating a slack change value steps, most improves performance of said ASIC with respect to said predetermined parameter of said timing arc on said list in order to generate an optimum performance slack value;

swapping said circuit component associated with said timing arc on said list with the second circuit component associated with said optimum performance slack value to improve performance of said ASIC layout with respect to said predetermined parameter; and repeating said steps of determining a performance difference, calculating a slack change value, repeating said determining a performance difference and calculating a slack change value steps for each second circuit component, identifying, and swapping for each timing arc on said list.

17. The method of claim 16:
wherein said step of repeating said generating, determining and calculating steps further comprises the step of sorting said list in ascending numerical order of said performance slack values;
wherein said swapping step further comprises the step of noting that said timing arc associated with said second circuit component is associated with a swapped component; and
wherein step of repeating said determining, calculating, repeating, identifying, and swapping steps further comprises the steps of:
   determining whether said timing arc on said list is noted to be associated with a swapped component, and
   skipping said step of repeating said determining, calculating, repeating, identifying, and swapping steps for said timing arc on said list determined to be associated with a swapped component.

18. The method of claim 16 wherein said predetermined parameter is the capacitive load of said timing arc.

19. The method of claim 16 wherein said predetermined parameter is the timing of signals on said timing arc.

20. The method of claim 16 wherein said predetermined parameter is the power dissipation on said timing arc.

21. The method of claim 16 further comprising the step of overriding one or more of said automatically generated pre-layout timing target value by entering a replacement pre-layout timing target value for any timing arc.

22. A method for improving, performance of an integrated circuit layout having, a plurality of internal cells coupled by internal signals therebetween, comprising the steps of:
   placing the plurality internal cells in the integrated circuit layout;
   routing, all internal signals in the integrated circuit layout;
   generating a pre-layout timing target for said internal signals of said integrated circuit automatically based on historical statistical information regarding the integrated circuit layout before said placing and routing steps;
   determining a post-layout signal timing for said internal signals after said placing and routing steps;
   comparing the post-layout signal timing with pre-layout timing target; and
   replacing at least one of the internal cells with a different cell when the post-layout signal timing does not conform to the pre-layout timing target.

23. The method of claim 22 further comprising the step of overriding one or more of said automatically generated pre-layout timing target by entering a replacement pre-layout timing target for any internal signal of said integrated circuit.

* * * * *